United States Patent
Lundquist et al.

(10) Patent No.: US 10,505,648 B1
(45) Date of Patent: Dec. 10, 2019

(54) SYSTEM AND METHOD FOR RF DIRECTION FINDING USING GEOGRAPHIC RF CHANNEL POWER MEASUREMENTS

(71) Applicant: ANRITSU COMPANY, Morgan Hill, CA (US)

(72) Inventors: Randy Lundquist, Shelley, ID (US); Thomas A. Elliott, Morgan Hill, CA (US)

(73) Assignee: ANRITSU COMPANY, Morgan Hill, CA (US)

( * ) Notice: Subject to any disclaimer, the term of this patent is extended or adjusted under 35 U.S.C. 154(b) by 0 days.

(21) Appl. No.: 16/116,172

(22) Filed: Aug. 29, 2018

Related U.S. Application Data

(60) Provisional application No. 62/551,764, filed on Aug. 29, 2017.

(51) Int. Cl.
*H04B 17/27* (2015.01)
*G01S 19/46* (2010.01)
*H04B 17/318* (2015.01)

(52) U.S. Cl.
CPC ............. *H04B 17/27* (2015.01); *G01S 19/46* (2013.01); *H04B 17/318* (2015.01)

(58) Field of Classification Search
None
See application file for complete search history.

(56) References Cited

U.S. PATENT DOCUMENTS

| | | |
|---|---|---|
| 5,801,525 A | 9/1998 | Oldfield |
| 5,812,039 A | 9/1998 | Oldfield |
| 5,909,192 A | 6/1999 | Finch |
| 5,977,779 A | 11/1999 | Bradley |
| 6,049,212 A | 4/2000 | Oldfield |
| 6,291,984 B1 | 9/2001 | Wong |
| 6,316,945 B1 | 11/2001 | Kapetanic |
| 6,331,769 B1 | 12/2001 | Wong |
| 6,496,353 B1 | 12/2002 | Chio |
| 6,504,449 B2 | 1/2003 | Constantine |
| 6,509,821 B2 | 1/2003 | Oldfield |
| 6,525,631 B1 | 2/2003 | Oldfield |
| 6,529,844 B1 | 3/2003 | Kapetanic |
| 6,548,999 B2 | 4/2003 | Wong |
| 6,650,123 B2 | 11/2003 | Martens |
| 6,665,628 B2 | 12/2003 | Martens |
| 6,670,796 B2 | 12/2003 | Mori |
| 6,680,679 B2 | 1/2004 | Stickle |

(Continued)

*Primary Examiner* — Alejandro Rivero
(74) *Attorney, Agent, or Firm* — Tucker Ellis LLP

(57) ABSTRACT

A method of estimating a location of an interference signal source includes using a first antenna configured to receive a signal from the interference signal source and using a second antenna arranged proximate to the first antenna and configured to receive global positioning system (GPS) signals. An initial trend in variation in power of a received signal from the interference signal source is determined relative to a position of the second antenna, wherein upon determining the initial trend, the initial trend is a current trend. In an iterative manner, the second antenna is directed to be repositioned. A secondary area associated with a lack of power measurement outside of an area traveled is identified and a further repositioning of the second antenna is determined to reduce the secondary area. An estimate of the location of the interference signal source is then determined.

20 Claims, 25 Drawing Sheets

(56) References Cited

U.S. PATENT DOCUMENTS

| | | |
|---|---|---|
| 6,700,366 B2 | 3/2004 | Truesdale |
| 6,700,531 B2 | 3/2004 | Abou-Jaoude |
| 6,714,898 B1 | 3/2004 | Kapetanic |
| 6,766,262 B2 | 7/2004 | Martens |
| 6,832,170 B2 | 12/2004 | Martens |
| 6,839,030 B2 | 1/2005 | Noujeim |
| 6,882,160 B2 | 4/2005 | Martens |
| 6,888,342 B2 | 5/2005 | Bradley |
| 6,894,581 B2 | 5/2005 | Noujeim |
| 6,917,892 B2 | 7/2005 | Bradley |
| 6,928,373 B2 | 8/2005 | Martens |
| 6,943,563 B2 | 9/2005 | Martens |
| 7,002,517 B2 | 2/2006 | Noujeim |
| 7,011,529 B2 | 3/2006 | Oldfield |
| 7,016,024 B2 | 3/2006 | Bridge |
| 7,019,510 B1 | 3/2006 | Bradley |
| 7,054,776 B2 | 5/2006 | Bradley |
| 7,068,046 B2 | 6/2006 | Martens |
| 7,088,111 B2 | 8/2006 | Noujeim |
| 7,108,527 B2 | 9/2006 | Oldfield |
| 7,126,347 B1 | 10/2006 | Bradley |
| 7,284,141 B2 | 10/2007 | Stickle |
| 7,304,469 B1 | 12/2007 | Bradley |
| 7,307,493 B2 | 12/2007 | Feldman |
| 7,509,107 B2 | 3/2009 | Bradley |
| 7,511,496 B2 | 3/2009 | Schiano |
| 7,511,577 B2 | 3/2009 | Bradley |
| 7,521,939 B2 | 4/2009 | Bradley |
| 7,545,151 B2 | 6/2009 | Martens |
| 7,683,602 B2 | 3/2010 | Bradley |
| 7,683,633 B2 | 3/2010 | Noujeim |
| 7,705,582 B2 | 4/2010 | Noujeim |
| 7,746,052 B2 | 6/2010 | Noujeim |
| 7,764,141 B2 | 7/2010 | Noujeim |
| 7,872,467 B2 | 1/2011 | Bradley |
| 7,924,024 B2 | 4/2011 | Martens |
| 7,957,462 B2 | 6/2011 | Aboujaoude |
| 7,983,668 B2 | 7/2011 | Tiernan |
| 8,027,390 B2 | 9/2011 | Noujeim |
| 8,058,880 B2 | 11/2011 | Bradley |
| 8,145,166 B2 | 3/2012 | Barber |
| 8,156,167 B2 | 4/2012 | Bradley |
| 8,159,208 B2 | 4/2012 | Brown |
| 8,169,993 B2 | 5/2012 | Huang |
| 8,185,078 B2 | 5/2012 | Martens |
| 8,278,944 B1 | 10/2012 | Noujeim |
| 8,294,469 B2 | 10/2012 | Bradley |
| 8,305,115 B2 | 11/2012 | Bradley |
| 8,306,134 B2 | 11/2012 | Martens |
| 8,410,786 B1 | 4/2013 | Bradley |
| 8,417,189 B2 | 4/2013 | Noujeim |
| 8,457,187 B1 | 6/2013 | Aboujaoude |
| 8,493,111 B1 | 7/2013 | Bradley |
| 8,498,582 B1 | 7/2013 | Bradley |
| 8,593,158 B1 | 11/2013 | Bradley |
| 8,629,671 B1 | 1/2014 | Bradley |
| 8,630,591 B1 | 1/2014 | Martens |
| 8,666,322 B1 | 3/2014 | Bradley |
| 8,718,586 B2 | 5/2014 | Martens |
| 8,760,148 B1 | 6/2014 | Bradley |
| 8,816,672 B1 | 8/2014 | Bradley |
| 8,816,673 B1 | 8/2014 | Barber |
| 8,884,664 B1 | 11/2014 | Bradley |
| 8,903,149 B1 | 12/2014 | Noujeim |
| 8,903,324 B1 | 12/2014 | Bradley |
| 8,942,109 B2 | 1/2015 | Dorenbosch |
| 9,103,856 B2 | 8/2015 | Brown |
| 9,103,873 B1 | 8/2015 | Martens |
| 9,176,174 B1 | 11/2015 | Bradley |
| 9,176,180 B1 | 11/2015 | Bradley |
| 9,210,598 B1 | 12/2015 | Bradley |
| 9,239,371 B1 | 1/2016 | Bradley |
| 9,287,604 B1 | 3/2016 | Noujeim |
| 9,331,633 B1 | 5/2016 | Robertson |
| 9,366,707 B1 | 6/2016 | Bradley |
| 9,455,792 B1 | 9/2016 | Truesdale |
| 9,560,537 B1 | 1/2017 | Lundquist |
| 9,571,142 B2 | 2/2017 | Huang |
| 9,588,212 B1 | 3/2017 | Bradley |
| 9,594,370 B1 | 3/2017 | Bradley |
| 9,606,212 B1 | 3/2017 | Martens |
| 9,696,403 B1 | 7/2017 | Elder-Groebe |
| 9,733,289 B1 | 8/2017 | Bradley |
| 9,753,071 B1 | 9/2017 | Martens |
| 9,768,892 B1 | 9/2017 | Bradley |
| 9,860,054 B1 | 1/2018 | Bradley |
| 9,964,585 B1 | 5/2018 | Bradley |
| 9,967,085 B1 | 5/2018 | Bradley |
| 9,977,068 B1 | 5/2018 | Bradley |
| 10,003,453 B1 | 6/2018 | Bradley |
| 10,006,952 B1 | 6/2018 | Bradley |
| 10,064,317 B1 | 8/2018 | Bradley |
| 10,116,432 B1 | 10/2018 | Bradley |
| 2005/0020284 A1* | 1/2005 | Benco ............... H04W 16/18 455/456.6 |
| 2006/0250135 A1 | 11/2006 | Buchwald |
| 2011/0037667 A1 | 2/2011 | Varjonen |
| 2013/0279488 A1* | 10/2013 | Singh ............... G01S 5/0063 370/338 |
| 2014/0195176 A1* | 7/2014 | Jones ............... H04W 16/18 702/58 |
| 2016/0050032 A1 | 2/2016 | Emerson |
| 2016/0353412 A1* | 12/2016 | Kaufman ........... H04W 24/08 |

* cited by examiner

SYSTEM AND METHOD FOR RF DIRECTION FINDING USING GEOGRAPHIC RF CHANNEL POWER MEASUREMENTS

CLAIM OF PRIORITY

This application claims the benefit of priority to U.S. Provisional Application titled "SYSTEM AND METHOD FOR RF DIRECTION FINDING USING GEOGRAPHIC RF CHANNEL POWER MEASUREMENTS", Application No. 62/551,764, filed Aug. 29, 2017, which application is herein incorporated by reference.

TECHNICAL FIELD

The present invention relates to detecting and locating sources of signal interference.

BACKGROUND

Interference in telecommunication networks is becoming more and more problematic as demand for wireless services continues to grow and allocated frequency bands become compressed. Interference can result in noisy links in analog transmissions, and limited range, dropped calls, or low data rates for digital transmissions. An indicator of interference in digital signals is a high noise floor in a receive channel. Upon identifying and locating a high receive noise floor, a spectrum analyzer can be employed to look for interference on the receive frequencies. Once an interfering signal is detected, the signal can be characterized to possibly identify the source of the interfering signal.

Sources of interference can be internal to a telecommunication network or can be external to the telecommunication network. External sources of interference can include not only signal transmitters, but also sources of impulse noise created whenever a flow of electricity is abruptly started or stopped. Many external, interfering signals cannot be identified using typical techniques and the source of the signal must be located by hunting for the source. However, the variety of different possible sources of interference and the ability of some sources to interfere from great distances, can make locating the source difficult.

DETAILED DESCRIPTION

Figure 1:
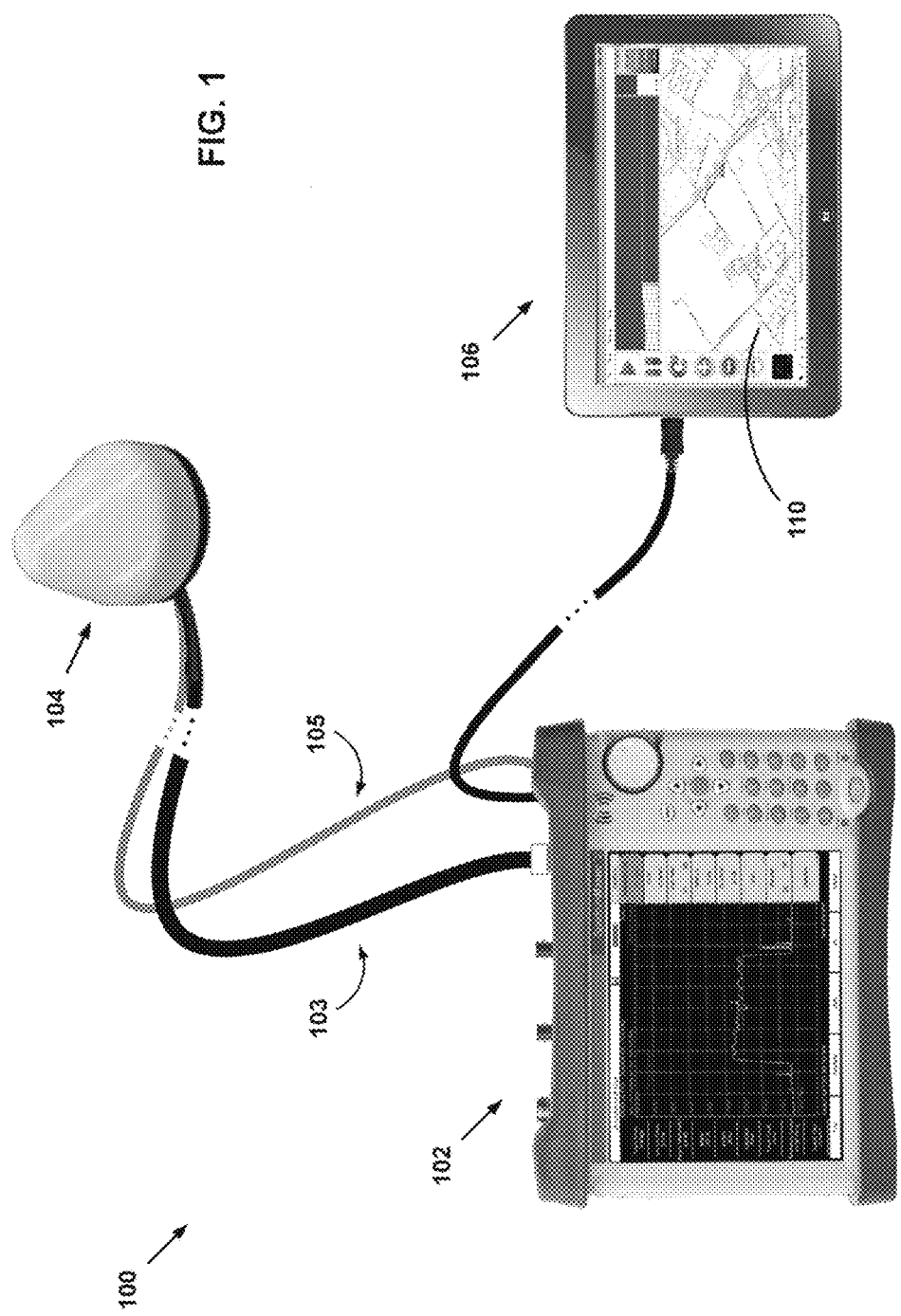
FIG. 1 illustrates a system for determining a location of a signal emitter.

The following description is of the best modes presently contemplated for practicing various embodiments of the present invention. The description is not to be taken in a limiting sense but is made merely for the purpose of describing the general principles of the invention. The scope of the invention should be ascertained with reference to the claims. In the description of the invention that follows, like numerals or reference designators will be used to refer to like parts or elements throughout.

It would be apparent to one of skill in the art that the present invention, as described below, may be implemented in many different embodiments of hardware, software, firmware, and/or the entities illustrated in the figures. Any actual software, firmware and/or hardware described herein is not limiting of the present invention. Thus, the operation and behavior of the present invention will be described with the understanding that modifications and variations of the embodiments are possible, given the level of detail presented herein.

External sources of interference capable of unacceptably affecting a telecommunication network can be difficult to locate, due to the myriad different types of sources capable of emitting interference and the fact that interference can be created at great distances. In order to more quickly locate a source, it is preferable to approximate a likely location of the source to narrow the geographic range of the location, and to follow this approximation with a search on foot to finally identify the location and nature of the source.

Currently, available techniques for approximating a likely location of a source of interference rely on the use of a direction finding (DF) antenna consisting of an array of antenna elements. One technique uses measurement of the phase angles between a reference antenna element and the other elements of the DF antenna to determine a direction from which an interfering signal is received. A correlative interferometer, for example, compares the measured phase differences with the phase differences obtained for a DF antenna system of known configuration at a known wave angle (i.e., a reference data set). The comparison is made for different azimuth values of the reference data set and the bearing is obtained from the data for which the correlation coefficient is at a maximum. Some techniques further locate the source of the interfering signal by means of a running fix, taking bearings at multiple locations and calculating the location of the source from the results using triangulation.

A DF antenna used for approximating a likely location of a source of interference can be quite large. For example, a nine element DF antenna usable to detect an LTE signal with a downlink band centered at about 880 MHz can be larger than three feet in diameter. Further, DF antennas typically operate in limited frequency bands, and due to their limited applicability, can be orders of magnitude more costly relative to omnidirectional antennas, which are widely used for a variety of applications, are generally inexpensive, and are usable over a wide range of frequencies.

FIG. 1 illustrates a system for locating a source of interference signal in accordance with an embodiment. The system is usable by a user, such as a field engineer and/or technician, to approximate the location of the interference signal source, reducing the amount of time required to eliminate or mitigate the interference signal source. Wireless carriers, regulatory agencies and broadcast and satellite operators, among others, can benefit from the ability to quickly narrow a location of the interference signal source to improve performance and/or reduce customer downtime. The system comprises an omnidirectional antenna and a global positioning system (GPS) antenna arranged proximate to the omnidirectional antenna. As shown, both antennas are housed as a single unit 104, although in other embodiments, the antennas can be separately housed. Further, as shown the single unit 104 includes a magnetized base that allows the single unit 104 to be mounted and held fixed on a metal roof of a vehicle, for example. By mounting to a vehicle, the system can quickly measure target signals received by the omnidirectional antenna over a large geographical area.

The system further comprises a spectrum analyzer 102. The omnidirectional antenna can be connected with the spectrum analyzer at a radio frequency (RF) IN port of the spectrum analyzer via a first cable 103, while the GPS antenna can be connected with the spectrum analyzer at a GPS port of the spectrum analyzer via a second cable 105. In an embodiment, the omnidirectional antenna is usable across a wide frequency range of the spectrum analyzer. In an embodiment, the omnidirectional antenna is usable over substantially the entire frequency range of the spectrum analyzer, thereby permitting use of a single omnidirectional antenna for any frequency allocated in the range of the spectrum analyzer (e.g., 9 kHz to 43 GHz for the MS2720T SPECTRUM MASTER® available from ANRITSU™).

The spectrum analyzer can further be connected with a computing device 106 on which a software system for locating the interference signal source is installed. As used herein, a software system includes a logic which is configured to perform methods in accordance with embodiments and can include instructions which when executed by a computer system, perform the particular method. In an embodiment, the system and method performed using the system are adapted to operate/process according to a particular algorithm, as generally described below, for example. As shown, the computing device is a tablet computer connected with the spectrum analyzer via a USB cable; however, in other embodiments the computing device can be any other device capable of executing the software system and communicating instructions to a use. For example, the computing device can be a laptop computer, mobile phone, or a computer integrated into a vehicle. Further, in other embodiments the GPS signal can be obtained from some other source, for example a commercially available navigation system, which when received by the computing device or the spectrum analyzer, can be synchronized and combined with RF power measurements to determine a location of the measurements.

In an embodiment, the system need not transmit signals, but rather receives signals, measuring power in those signals falling within a target frequency or band of frequencies. The software system can use channel power measurements to enable locating a variety of signal types, from wideband modulated signals to narrowband or continuous wave (CW) signals. In an embodiment, the channel power bandwidth of the software system is configurable as appropriate for the target interference signal source. The software system can also be configured to track signals having a frequency that drifts over time.

As will be appreciated, an interference signal source will commonly emit at a frequency or in a frequency band that is actively being used by a telecommunication network to transmit signals. For example, an interference signal source may be emitting a signal hidden in an LTE uplink band that is actively being used by the telecommunication network. In an embodiment, the location software can use a "min hold" algorithm to capture the interfering signal while eliminating the LTE traffic signal from measurement consideration. For example, a transmission can include a 20 MHz band that will periodically be dead. The min hold algorithm is an algorithm that identifies the interference signal source at the minimum received power. The received signal from the telecommunications network will drop to baseline over the course of a few seconds, allowing the interference signal to be identified. Further, in an embodiment, the location software is usable to locate pulsed signals via a "max hold" algorithm that captures intermittent signals only when transmitting, thereby avoiding erroneously measuring a pulsed signal when the pulsed signal is not active.

Figure 2:
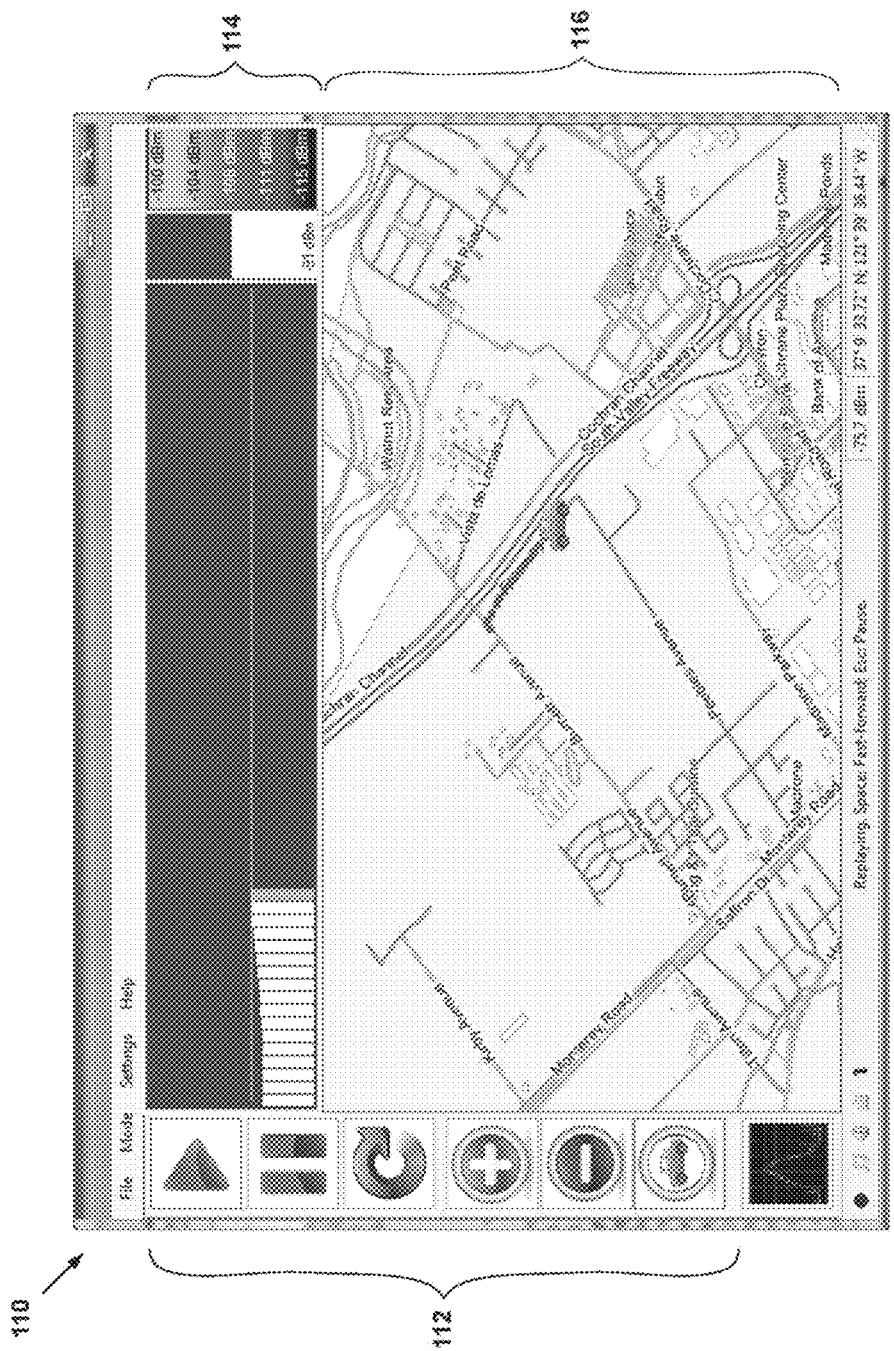
FIGS. 2 and 3 illustrate an exemplary screenshot of an application usable with systems and methods, the screenshot showing initial data collection.
Figure 3:
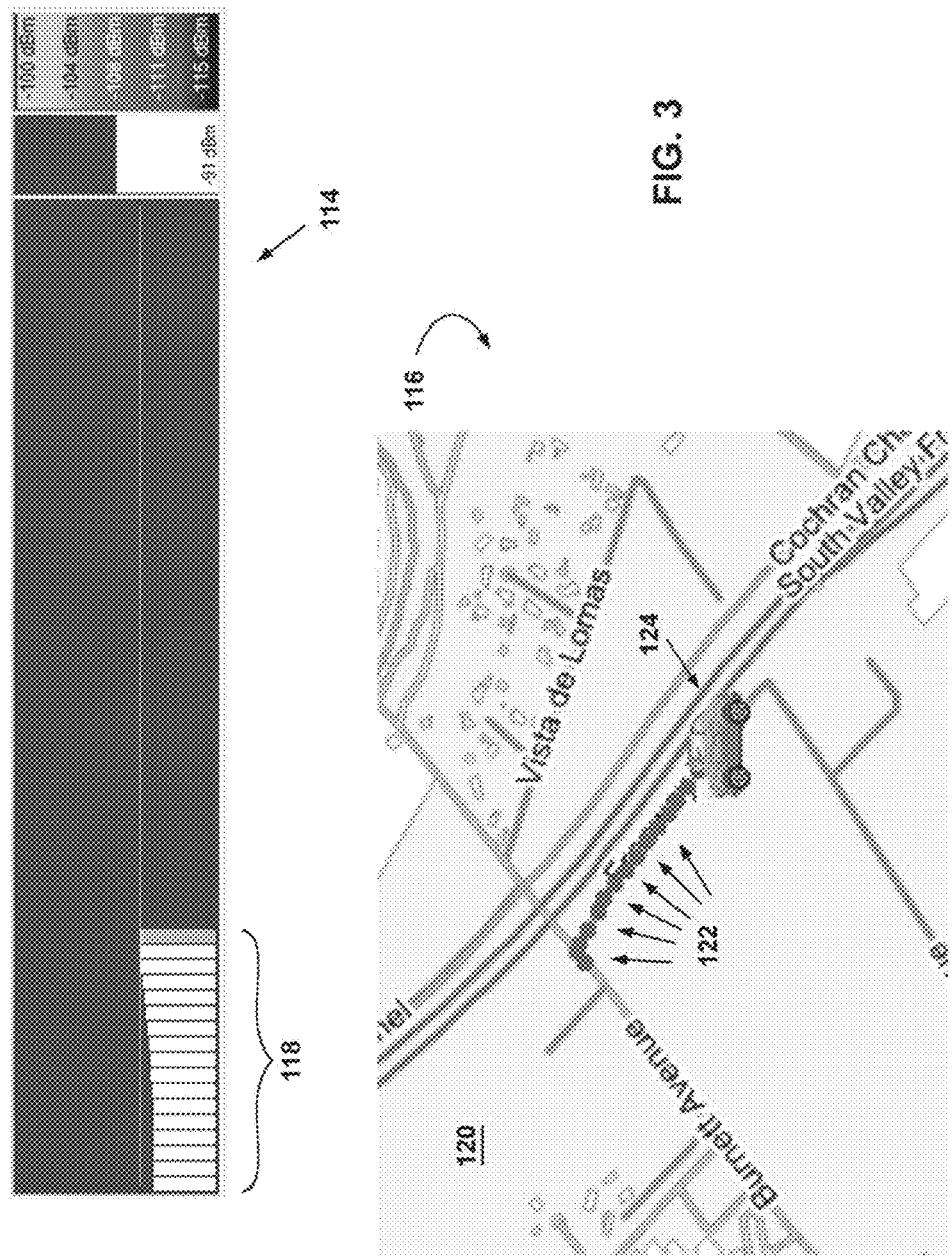

FIG. 2 illustrates an exemplary screenshot and FIG. 3 illustrates a partial screenshot of an application executed by the software system and usable with systems and methods in accordance with an embodiments. The screenshot shows initial data collection by a user having installed and activated the system on a vehicle. In the embodiment, the single unit comprising the omnidirectional and GPS antennas is positioned and magnetically held on the roof of the vehicle, with the first and second cables entering the cabin of the vehicle which can hold the spectrum analyzer and the computing device. Initial data collection includes measurements obtained using the spectrum analyzer and provided to the computing device. As shown, power levels of individual measurements are displayed as a bar chart of power levels in a power display 114 at the top of the application. Individual measurements can be removed from the power display if the data is collected and a measurement is determined to be the result of a reflection or other anomalous source. As the vehicle approaches the source of the interfering signal, the power level of a measurement increases. As the vehicle drives further away from the source of the interfering signal, the power level of a measurement decreases. A running statistical calculation is performed from obtained data to estimate the location of the source base on the measurement data and associated GPS data.

In an embodiment, the software system divides the search area into a grid, assigning measurements to cells of the grid as appropriate. For example, in an embodiment the software system can take a space that is a square two miles on a side, where the current location is the center of the square, and divide the space into one hundred rows and one hundred columns to create ten thousand cells. In an embodiment, an algorithm of the system software assumes that the source of the interfering signal is modeled at a time in each of those cells, so that ten thousand calculations are performed at a time. The software system then determines a best match between the data and the models. The software system attempts to identify the grid cell, which if it had a source, would give you the power distribution measured as the vehicle drives around. The models and best match are performed without actual knowledge of the power of the source of the interfering signal, and the ten thousand calculations are performed multiple times in an iterative fashion to determine the power as well as the position that provides the best match.

Below the power display is a map display 116 illustrating the position of the vehicle 124 and the position of measurements 122 on a map 120 of at least a portion of the geographic search area. As shown, the system has made seventeen power measurements at seventeen locations. GPS data obtained in synchronization with each power measurement is used to assign the measurements to location on the map and the measurements are illustrated on the map to resemble a "bread crumb" trail. The screenshot also illustrates a control display 112 provided to a user to control the collection and display of measurement data.

Figure 4:
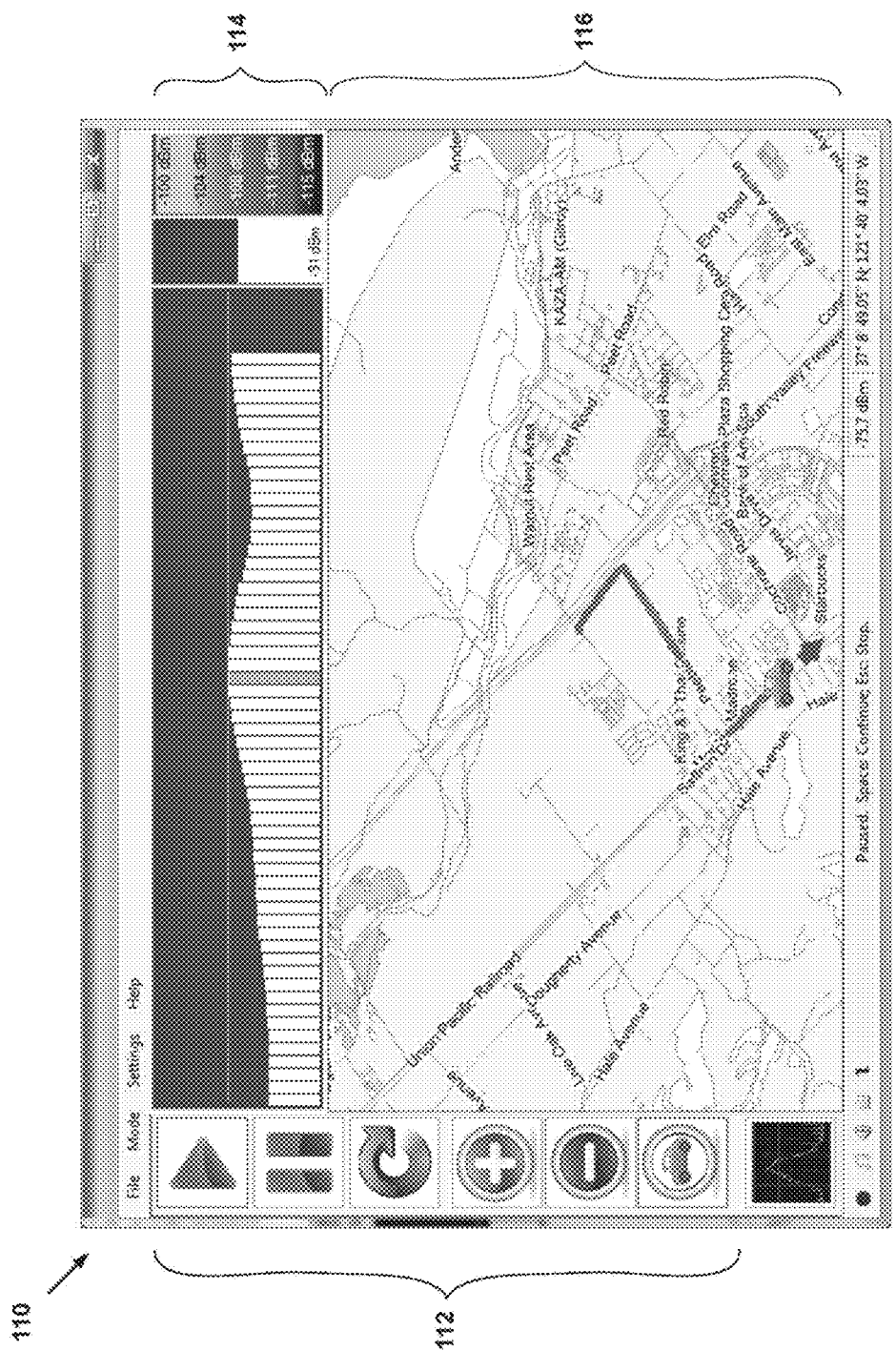
FIGS. 4-9 illustrate exemplary screenshots of the application showing additional data collection and a first stage of locating a source of interference.
Figure 5:
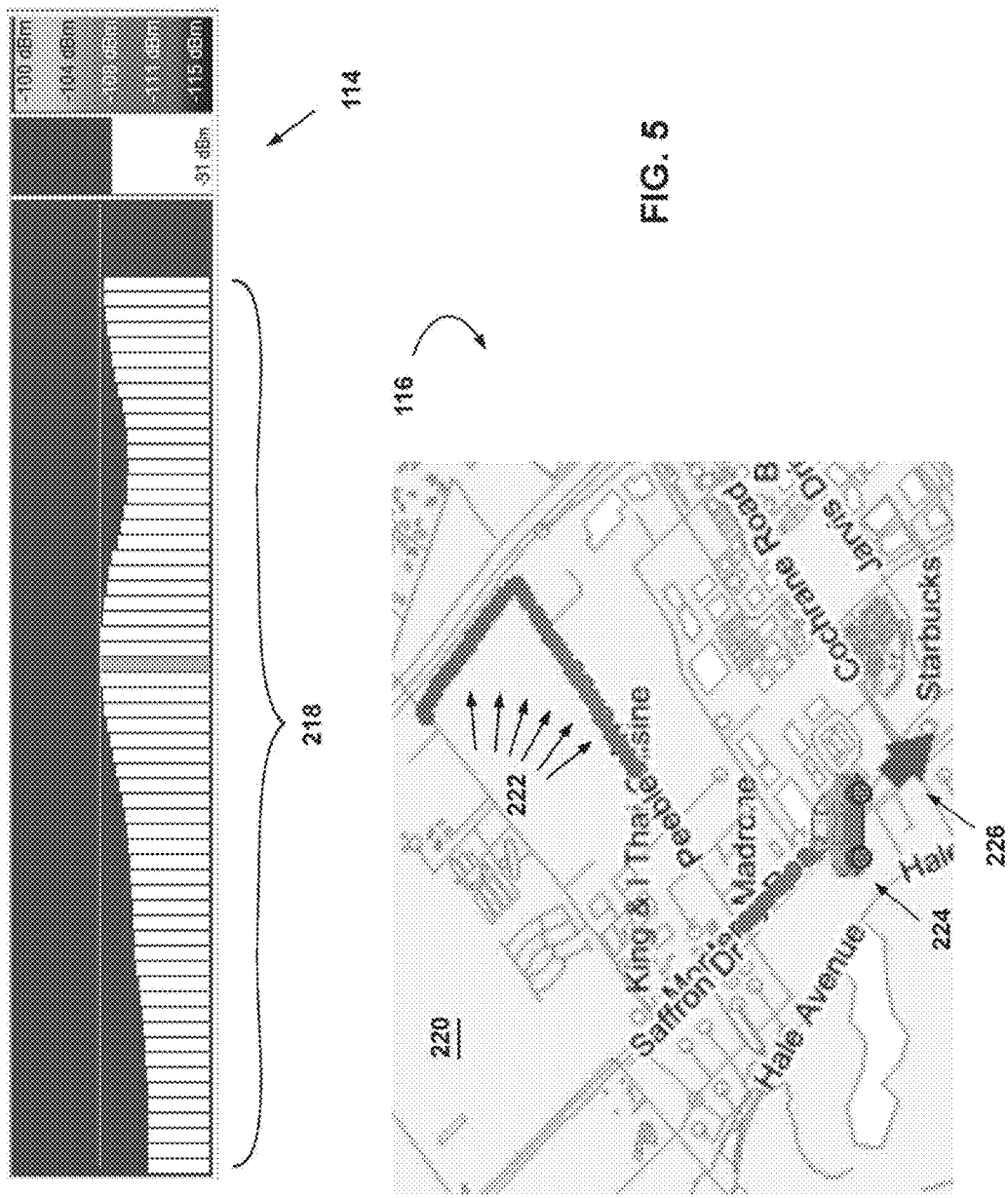

FIG. 4 illustrates an exemplary screenshot and FIG. 5 illustrates a partial screenshot of the application executed by the software system showing the system entering a stage of directing a user to collect additional data in specified locations. In an embodiment, this stage is entered by the software system when the software system has identified a peak in data (the shaded bar in the middle of the power display) that exceeds a minimum threshold, with a minimum number of usable measurements (e.g., thirty five) having been obtained. As shown, fifty-nine measurements 218, 222 are obtained and illustrated on the map 220, with the peak having been obtained midway in the data set. The software system then begins to provide directions for driving the vehicle 224 to obtain additional data. In an embodiment, the directions are formulated with knowledge of the street layout of the map, to thereby predict a potential positions for additional data likely to further benefit a determination of approximate location of the source. As shown, an arrow indicator 226 appears on the map display indicating a direction of travel. The arrow indicator can be estimated, for example, based on a determination made by the software system of a direction in which power is likely to increase. In an embodiment, the software system can further provide an audial cue to the user, for example in the form of a voice, as used in turn-by-turn direction devices. In other embodiments, alternative or additional audial and visual cues can be used to instruct the user as to where to position the vehicle.

Figure 6:
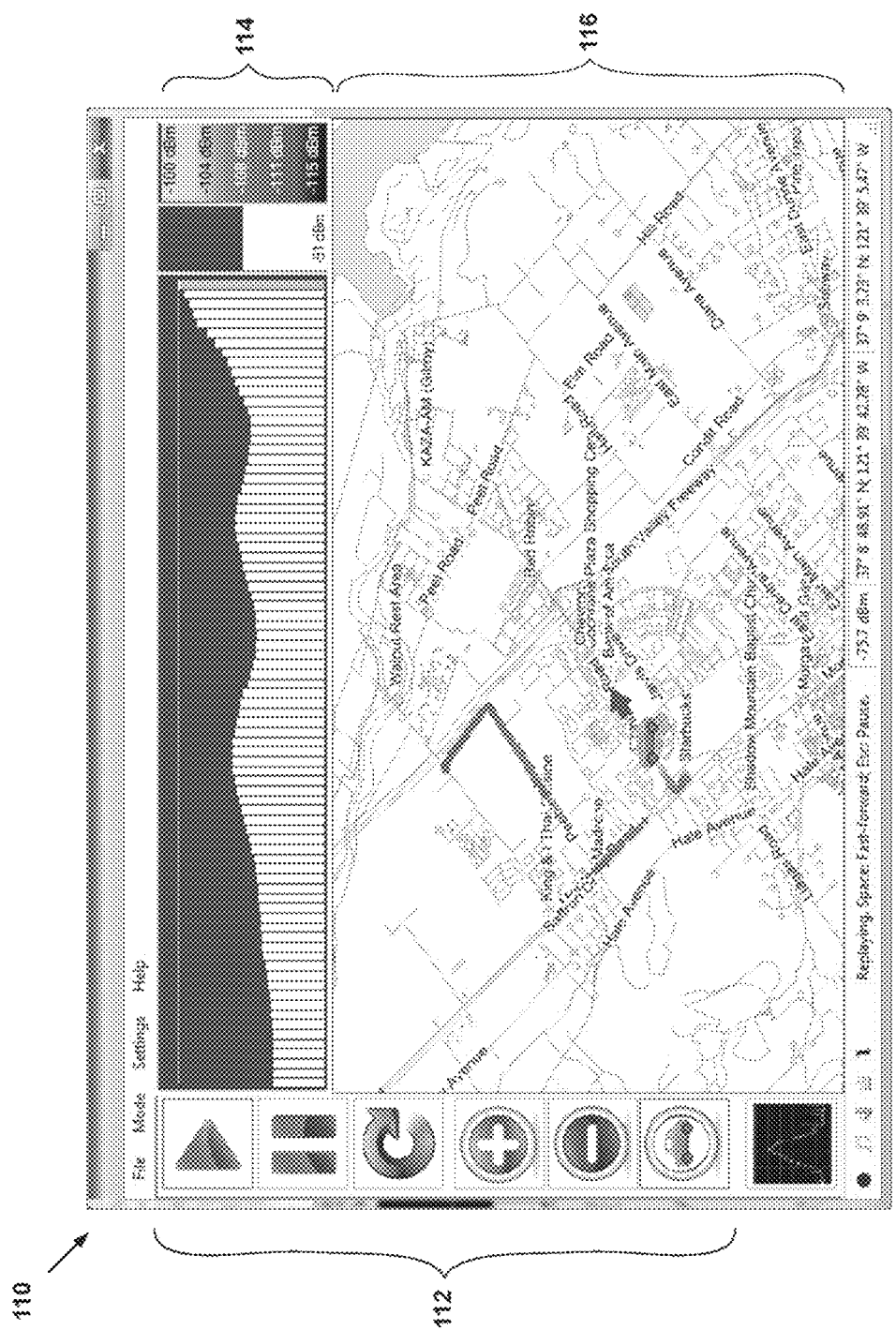
Figure 7:
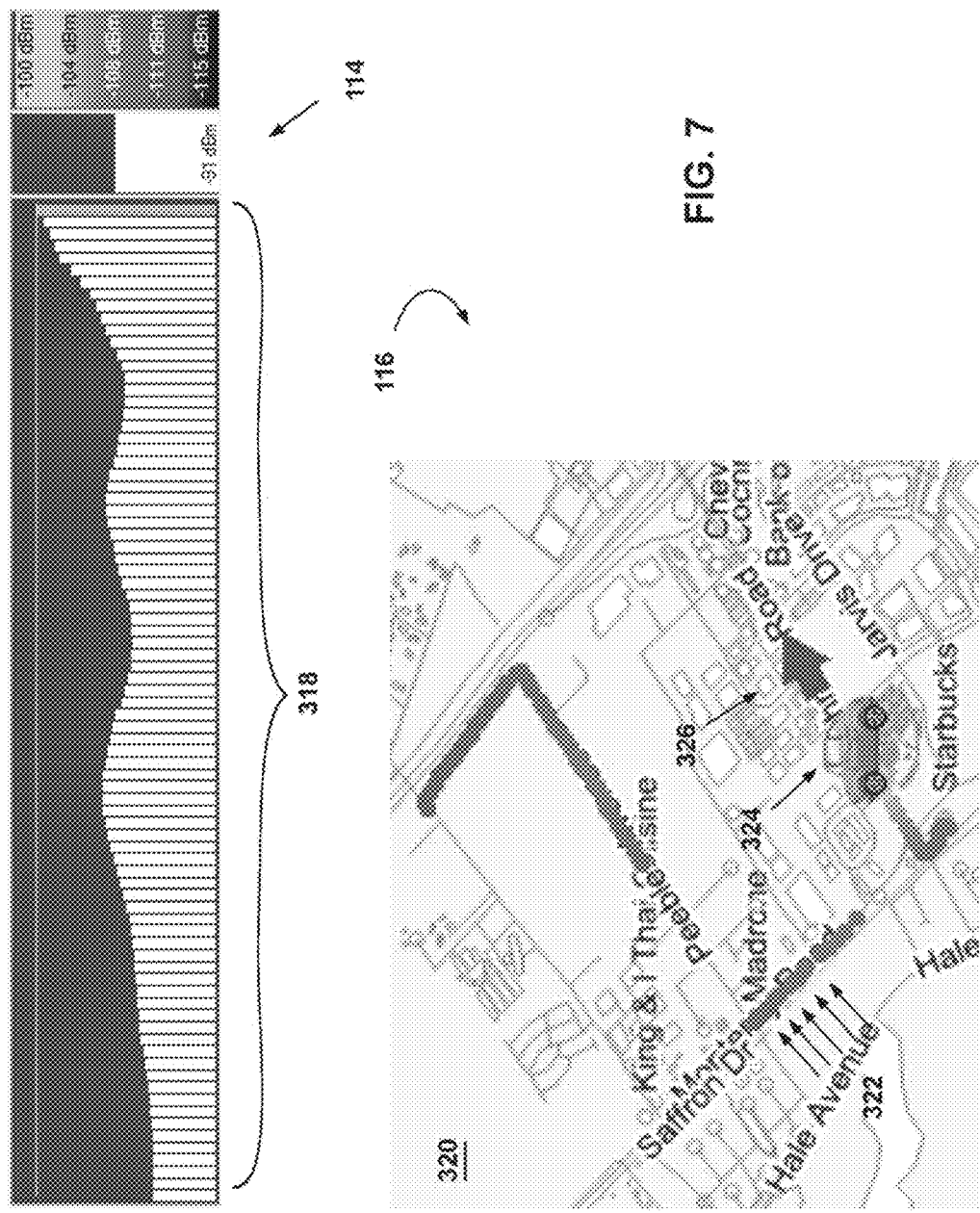

FIG. 6 illustrates an exemplary screenshot and FIG. 7 illustrates a partial screenshot of the application executed by the software system showing the system continuing the stage of directing the user to collect additional data in specified locations. As shown, the system has obtained a large set of measurement data 318, 322 shown in sequence of collection in the power display and illustrated on the map 320. A new maximum measurement is identified from the data; however, the power level has not decreased to indicate that the vehicle has passed the source and the vehicle 324 continues to be provided a cue on the map 320 of an arrow indicator 326 indicating a direction of travel.

Figure 8:
Figure 9:
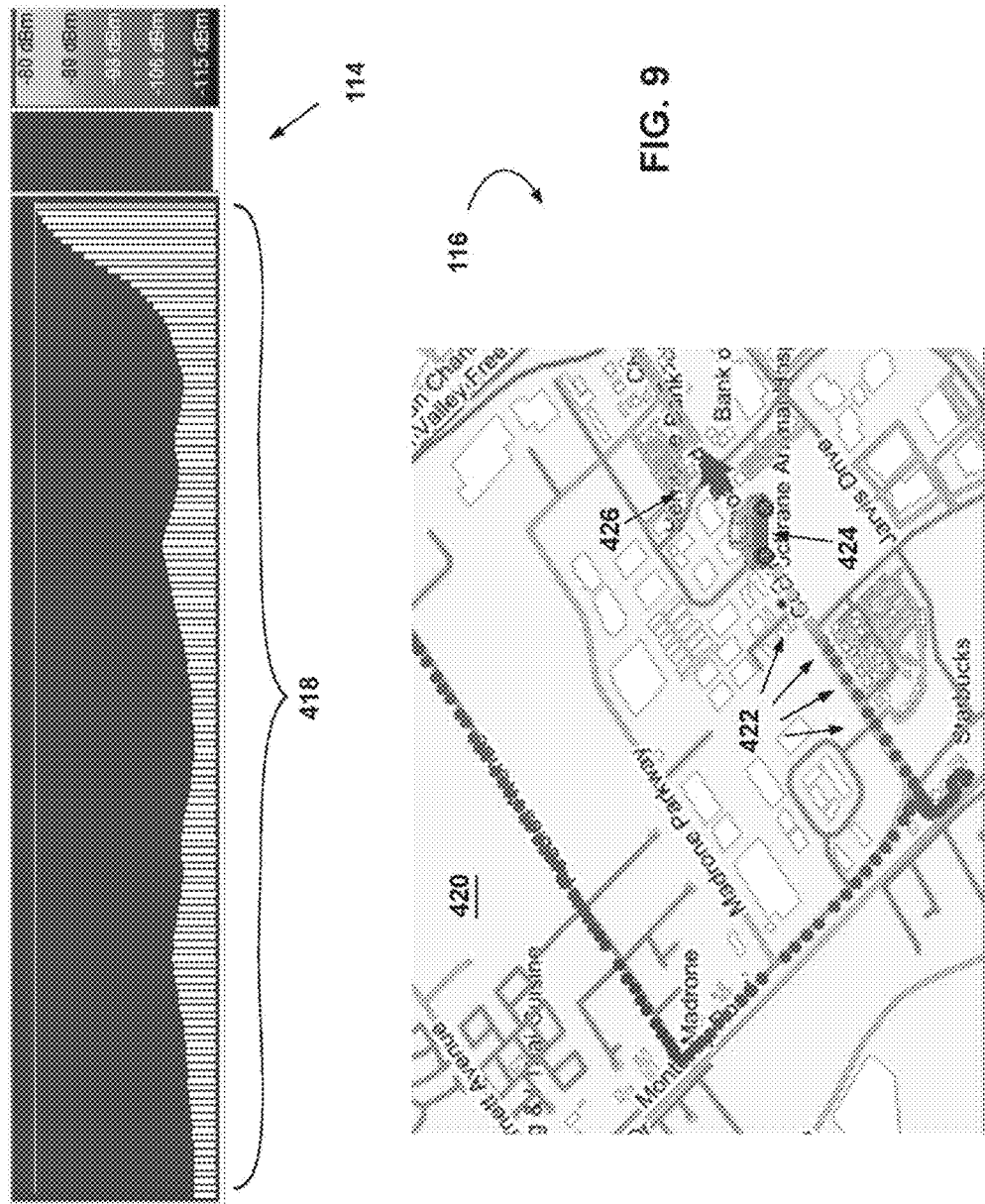

FIG. 8 illustrates an exemplary screenshot and FIG. 9 illustrates a partial screenshot of the application executed by the software system showing the system continuing the stage of directing the user to collect additional data in specified locations. As shown, the large set of measurement data 418, 422 continues to grow and continues to be shown in sequence of collection in the power display and illustrated on the map 420. The new maximum measurement continues to increase and be identified from the data, and the vehicle 424 continues to be provided a cue on the map 420 of an arrow indicator 426 indicating a direction of travel.

Figure 10:
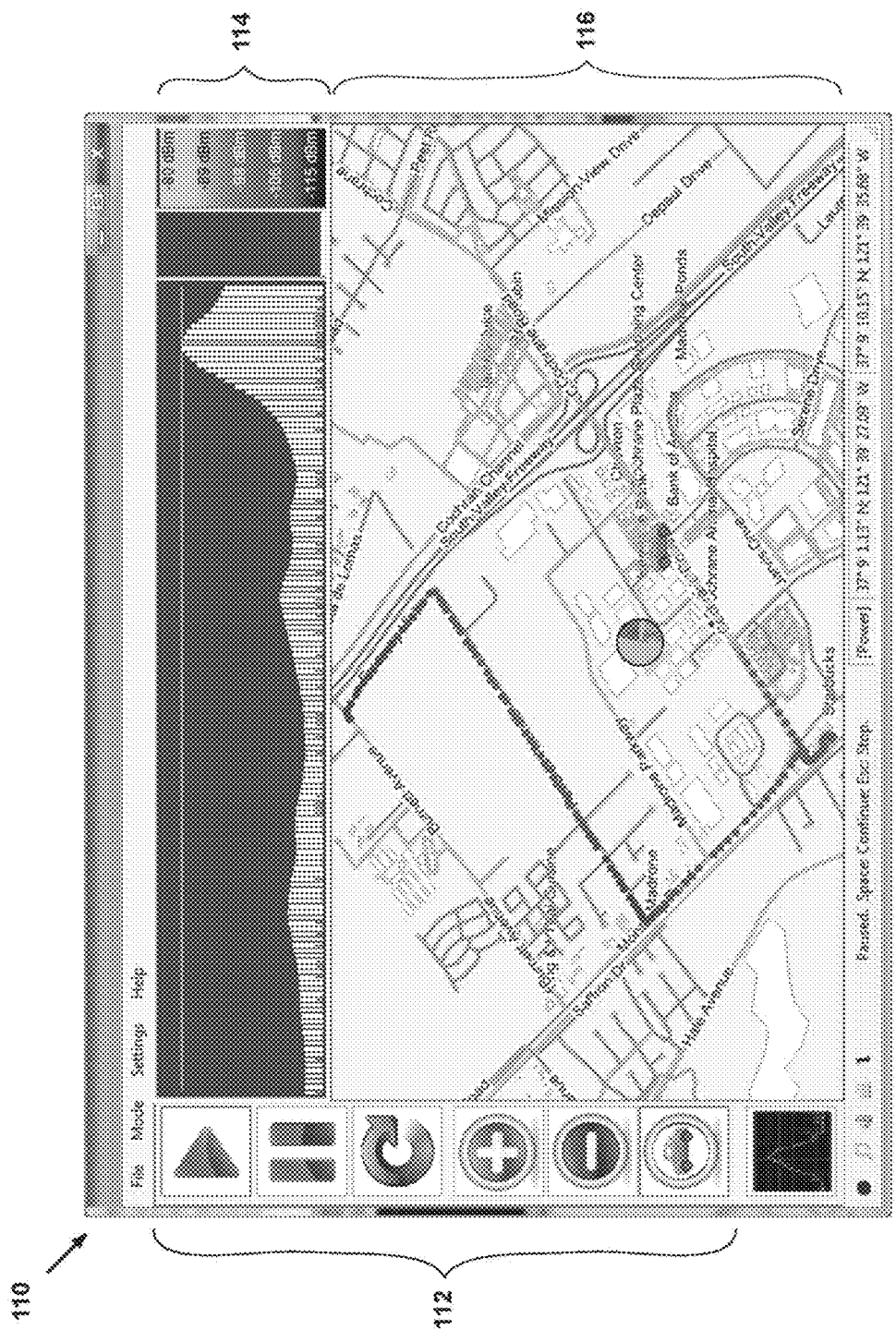
FIGS. 10-13 illustrate exemplary screenshots of the application showing additional data collection and a second stage of locating a source of interference.
Figure 11:
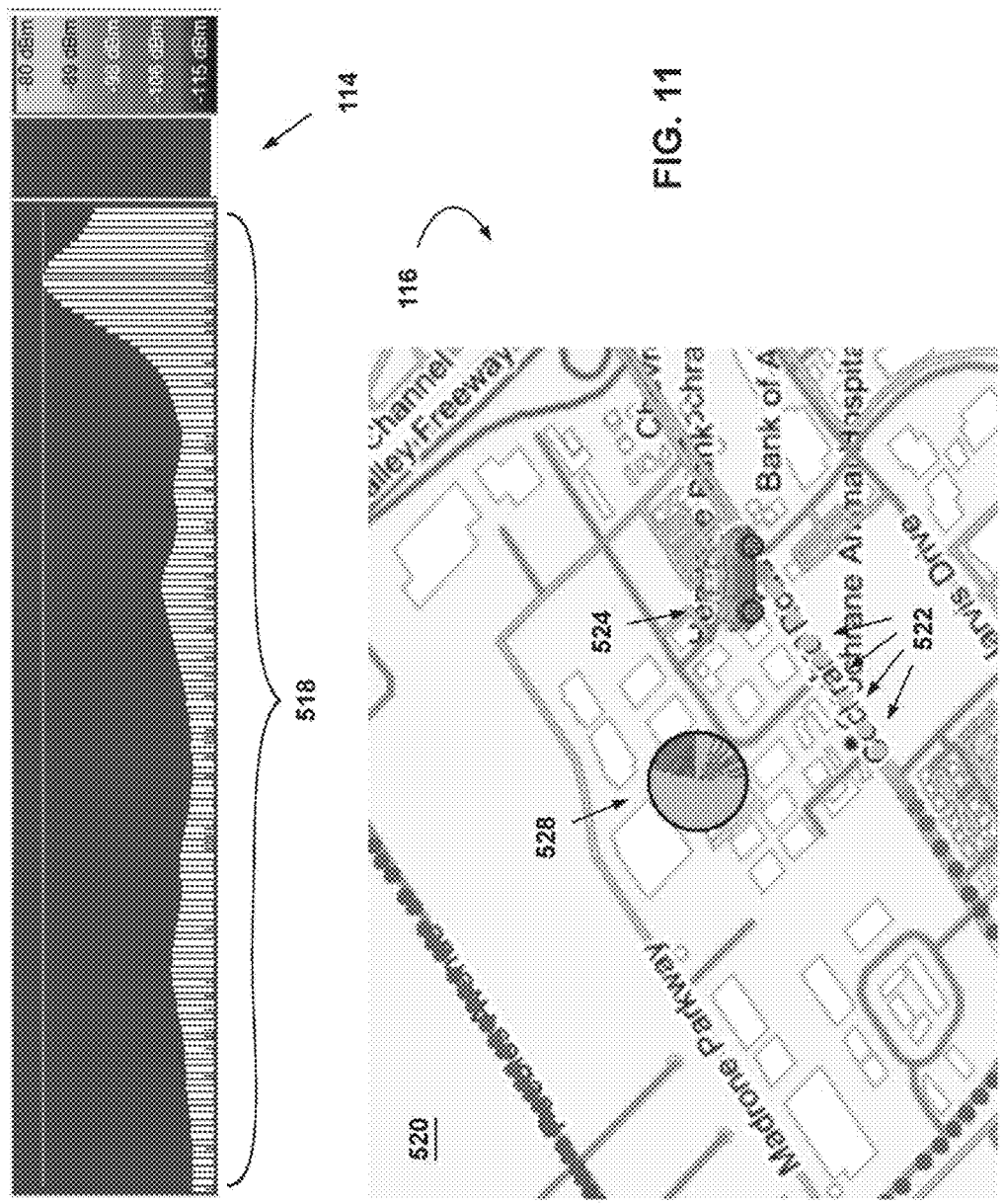

FIG. 10 illustrates an exemplary screenshot and FIG. 11 illustrates a partial screenshot of the application executed by the software system showing the system entering a stage of estimating and illustrating an approximate location of the source of interference, along with a degree in confidence determined in the estimate based on the aggregate of the measurements of power and location. In an embodiment, this stage is entered by the software system when the software system has identified a peak in data (the shaded bar of the power display) that exceeds a minimum threshold, with a minimum number of usable measurements having been obtained. In an embodiment, initial data can be discounted relative to newer data as contributing less, based on distance from estimated location. This can be indicated on the map 520 by the darkness in shading of the "bread crumbs" representing measurements 522. As shown, the lighter shaded measurements indicate measurements that are more heavily weighted in an estimation.

In an embodiment, the estimate of the location of the interference signal source is represented visually on the map in the form of a circle 528 shaded to indicate the data that forms the basis of the estimate. As shown, the lightly shaded areas of the circle indicate a direction from which data has been obtained and the darker shaded areas of the circle indicate a direction from which no data has been obtained or a direction from which a degree of confidence in the data is low. As shown, the alternatingly shaded sections of the circle indicate that the vehicle was driving at such a speed that measurements were spaced out far enough to include gaps between the measurements. As noted above, the software system can divide the search area into a grid, assigning measurements to the grid as appropriate and displaying the circle so that the circle is sized to cover all of the areas of the grid that exceed a certain confidence threshold. In an embodiment, the software system can calculate a value indicating a likelihood that a source is in each cell. The system software then finds the maximum cell value and assigns all values within a percentage (i.e., the confidence threshold) of that value to the circle. Thus, the circle could be as large as several cells of the grid, or as small as a single cell of the grid. There is a probability of location for each grid cell. In an embodiment, the user is then instructed to drive to, near or around the estimated location to confirm the estimate generated by the data set. As will be appreciated, obtaining data in the direction defined by rays extending out from portions of the circle that are darkly shaded (and that thereby indicate a paucity of data).

Figure 12:
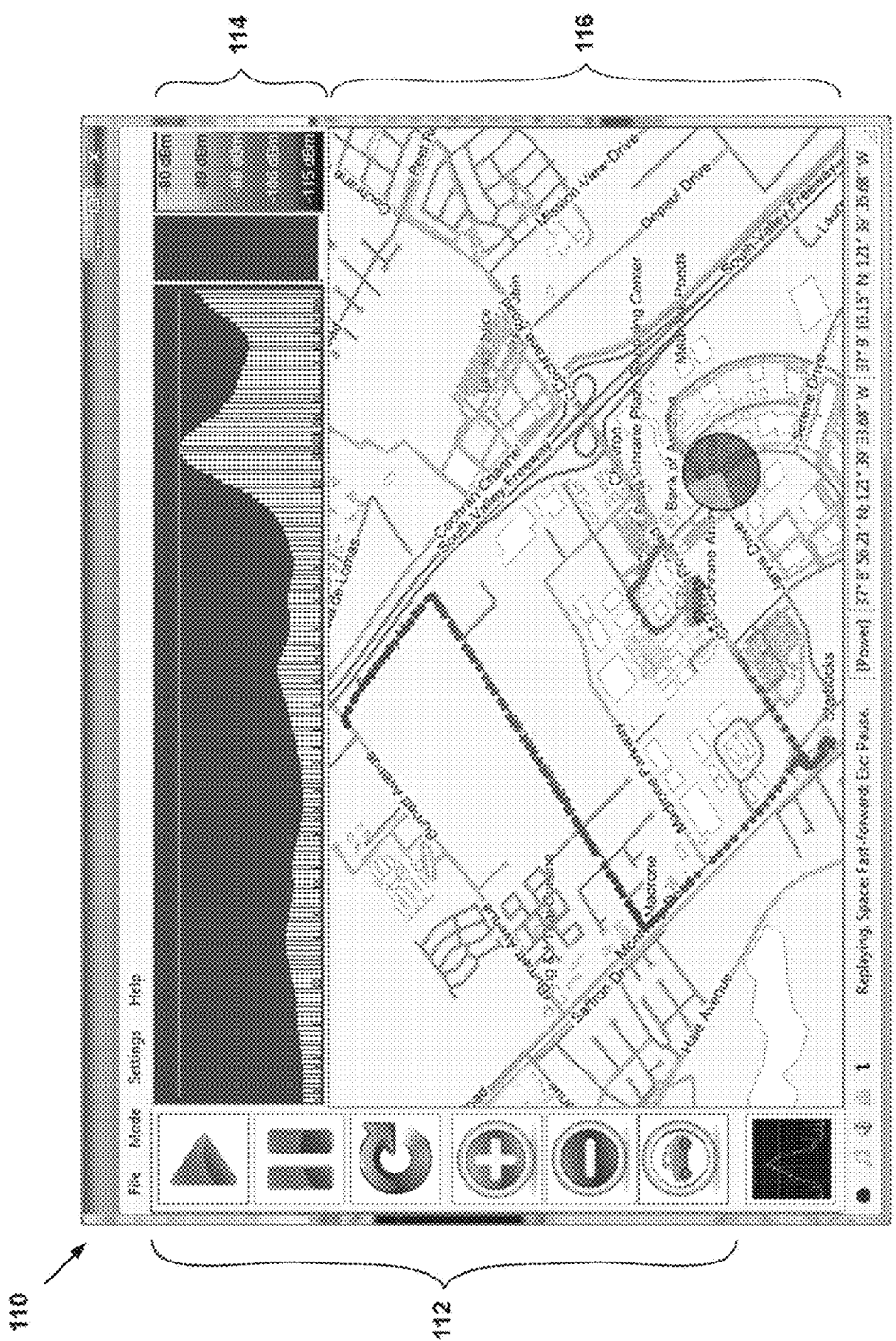
Figure 13:
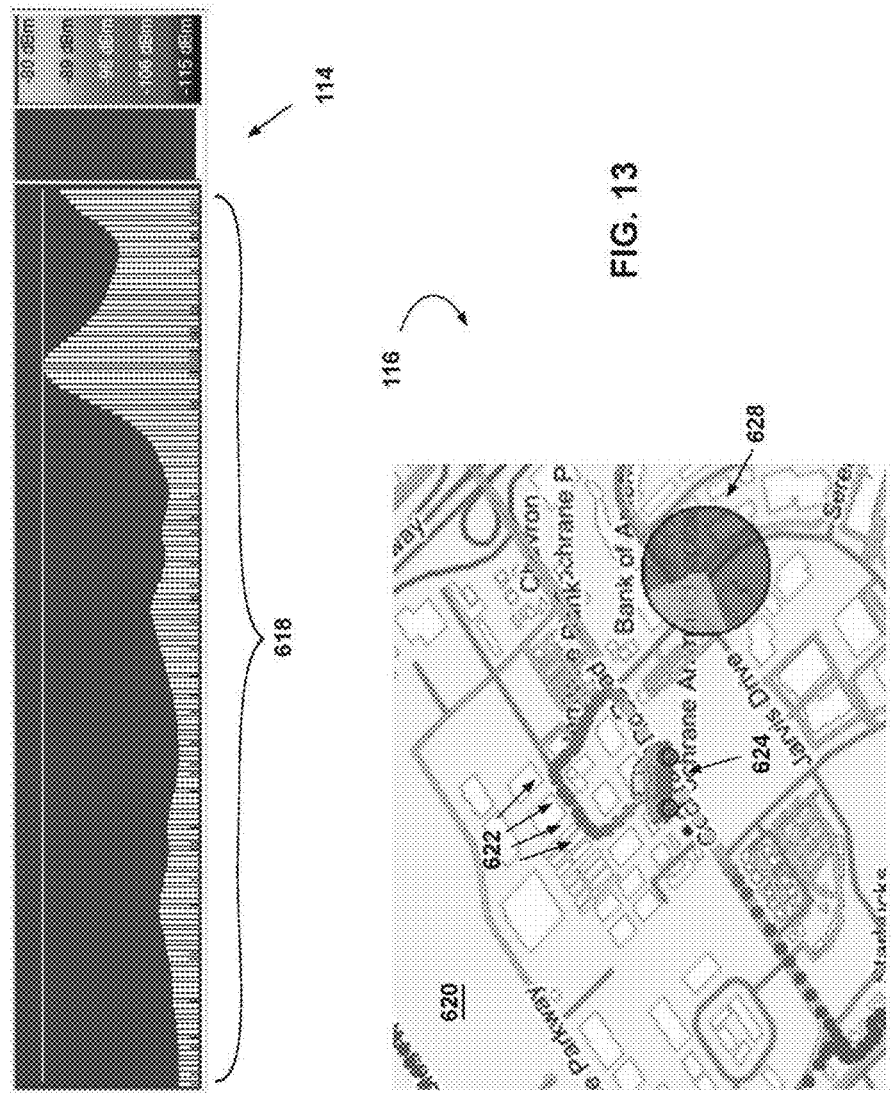

FIG. 12 illustrates an exemplary screenshot and FIG. 13 illustrates a partial screenshot of the application executed by the software system showing the system continuing in the stage of estimating and illustrating an approximate location of the source of interference, along with a degree in confidence determined in the estimate based on the aggregate of the measurements of power and location. However, as shown, the vehicle 624 and additional measurements 622 as displayed on the map 620 illustrate that the initial estimate is incorrect, and a new estimate is generated from the data set with the additional measurements (or refined to eliminate sources of false positives). The new estimate is displayed again as a new circle 628. As can be seen, the new circle is larger than the previous, indicated that the source of the interference is estimated to be within one of several cells on the grid. Further, the darkly shaded portion of the new circle indicates locations where additional data can be obtained to refine the estimate.

It is noted that calculation time can increase exponentially with more data points. In an embodiment, the software system caps a number of measurements used to calculate an estimate for location (e.g., 50 data points). As can be seen in FIGS. 10-13, ticks can be seen in multiple power measurements in the bar charts of the power display. The bars with ticks indicate power measurements used to calculate an estimate for location. Although the low power regions are useful for indicating where the source is not, high power readings can be more useful information for determining the location of the source. In a typical search, low power readings are more common, with high power reading indicating that the user is closing in on a signal source. In an embodiment, the software system can apply a statistical distribution function to randomly select which power measurements to use, weighted heavily towards high power readings, thus bars with ticks are denser where the power is highest.

As will be appreciated, the source location relocates from one side of the map display of "Cochrane Road" to the other side. If the vehicle is driving down a road in a straight line, an interferer can be on either side of the vehicle and respond similarly in terms of power levels. For example, power can increase as the vehicle travels down the road, and power can increase in the same fashion from an interferer on either side of the road. Distance from the interferer can be estimated based on a rate of power decrease, as power will decrease predictably (e.g., using an inverse square law), but the distance estimating can be correct to an interferer on either side of the road, as the measurement is symmetrical along the road. For this reason, a sufficient amount of data obtained from multiple directions is preferred to provide estimates of a source of an interfering signal (e.g., measurement from multiple axes).

Figure 14:
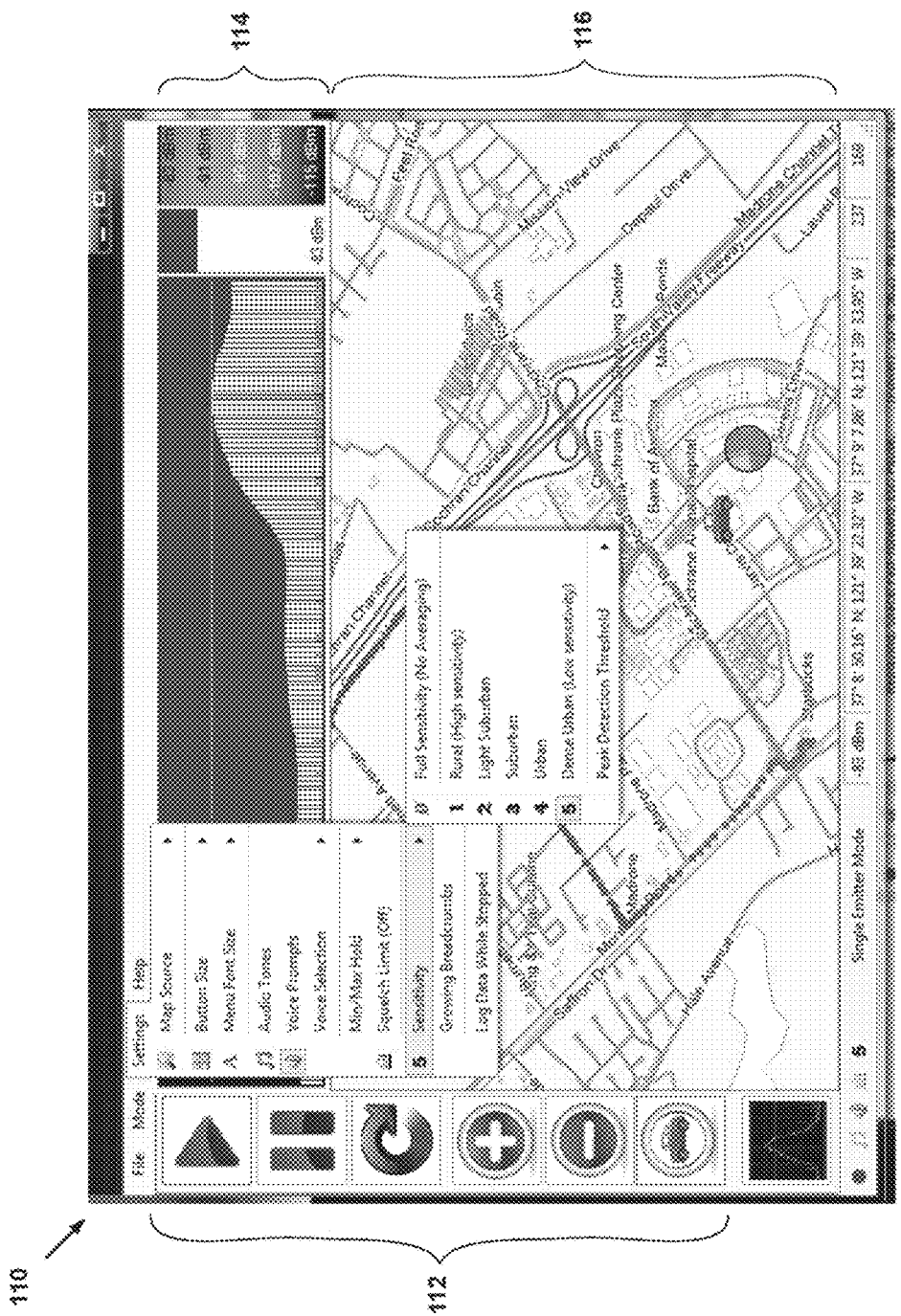
FIG. 14 illustrates an exemplary screenshot of the application showing an adjustment in sensitivity of the application.
Figure 15:
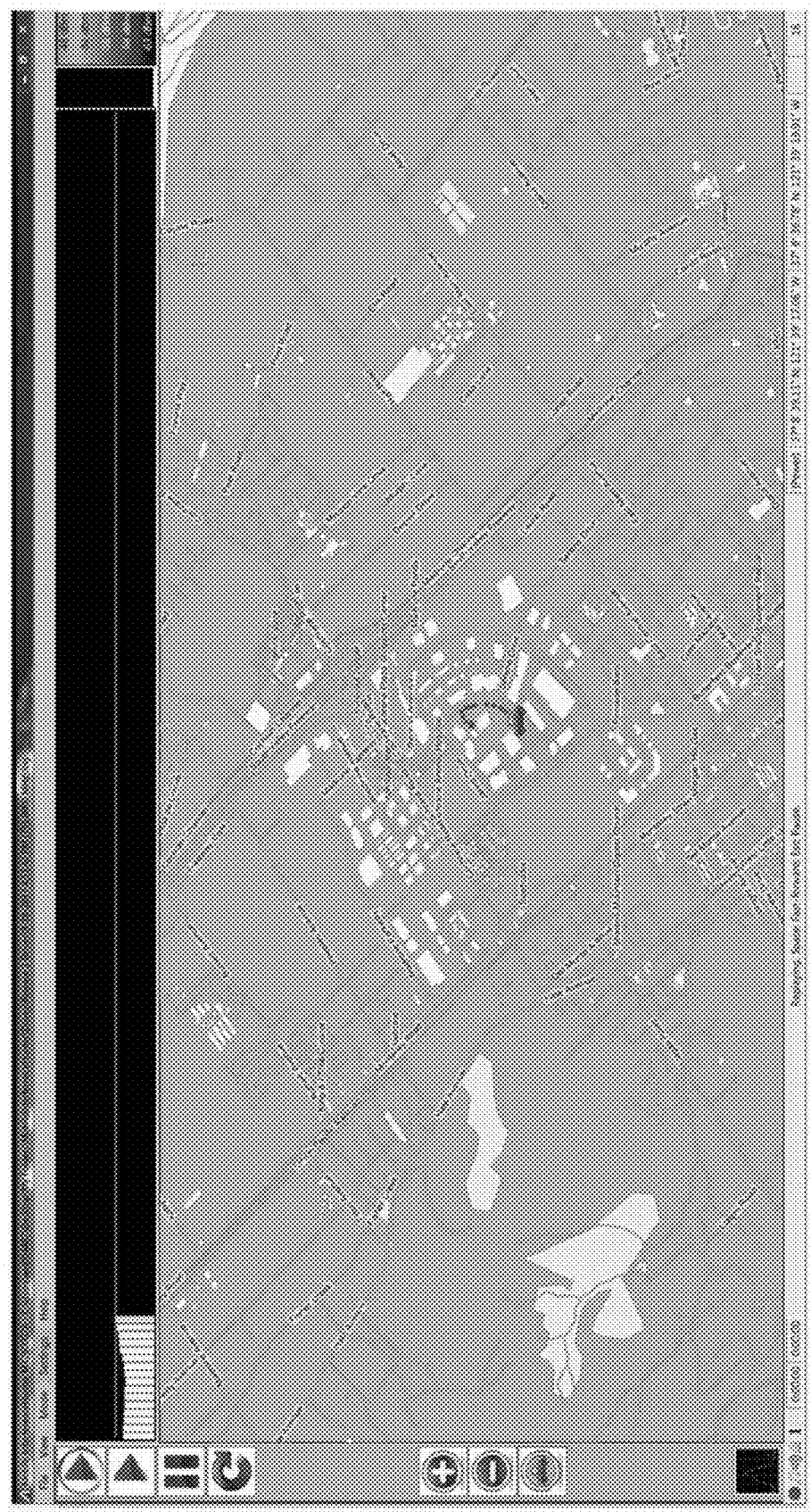
FIGS. 15-25 illustrate exemplary screenshots of an application usable with systems and methods in accordance with embodiments of the present invention, the screenshots showing data collection for reducing ambiguity in a location of a signal interference source.
Figure 16:
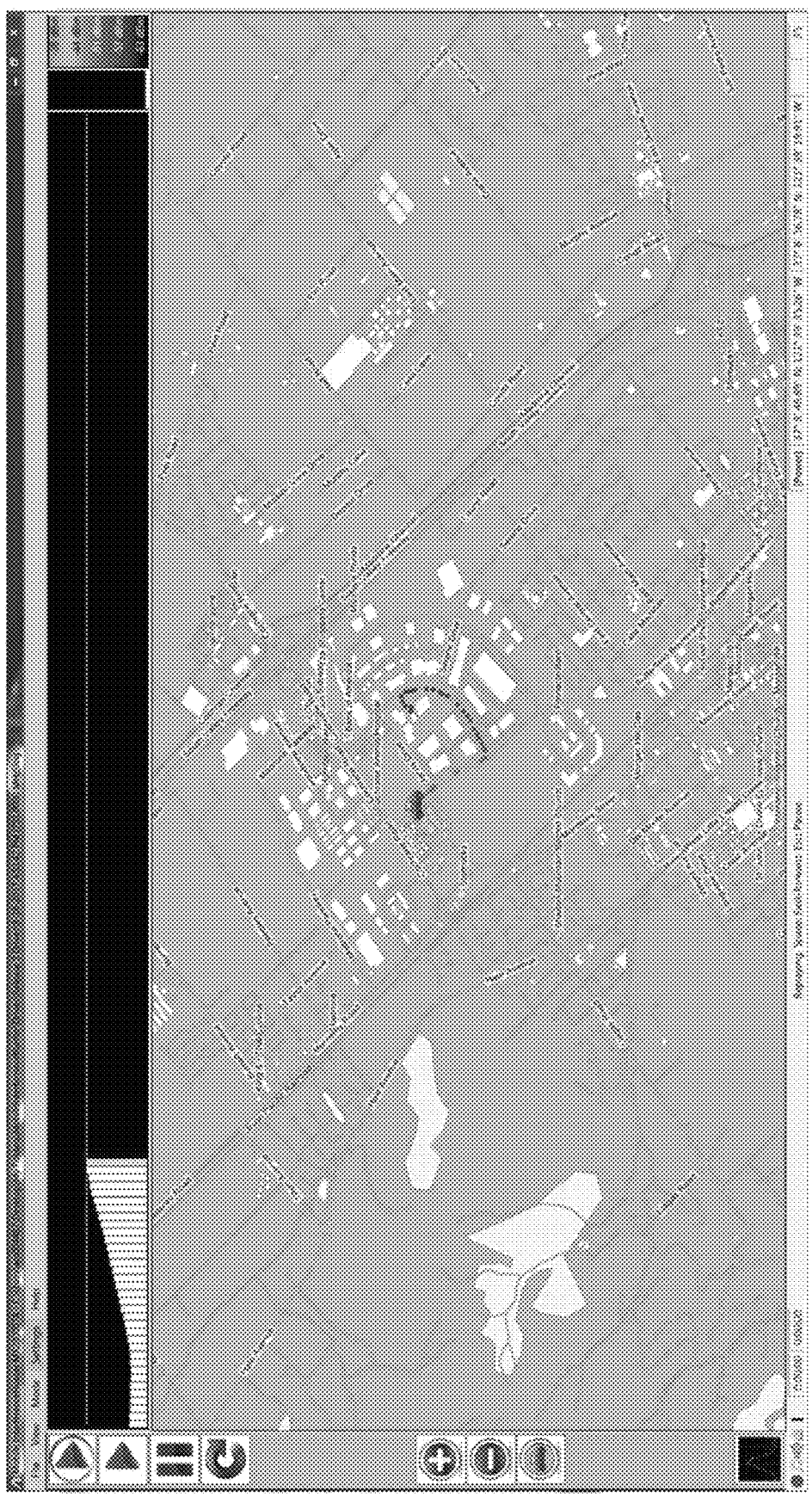
Figure 17:
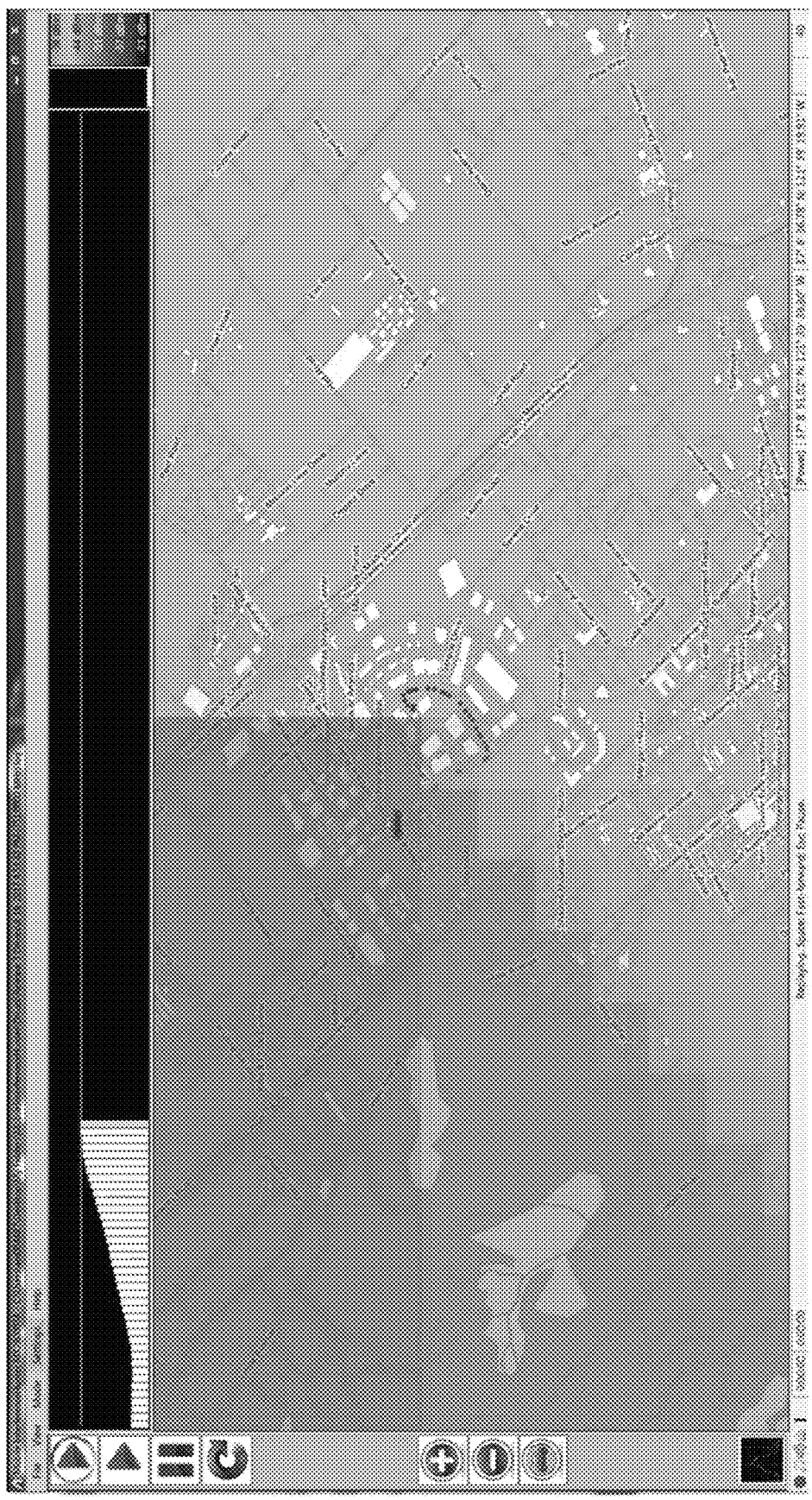
Figure 18:
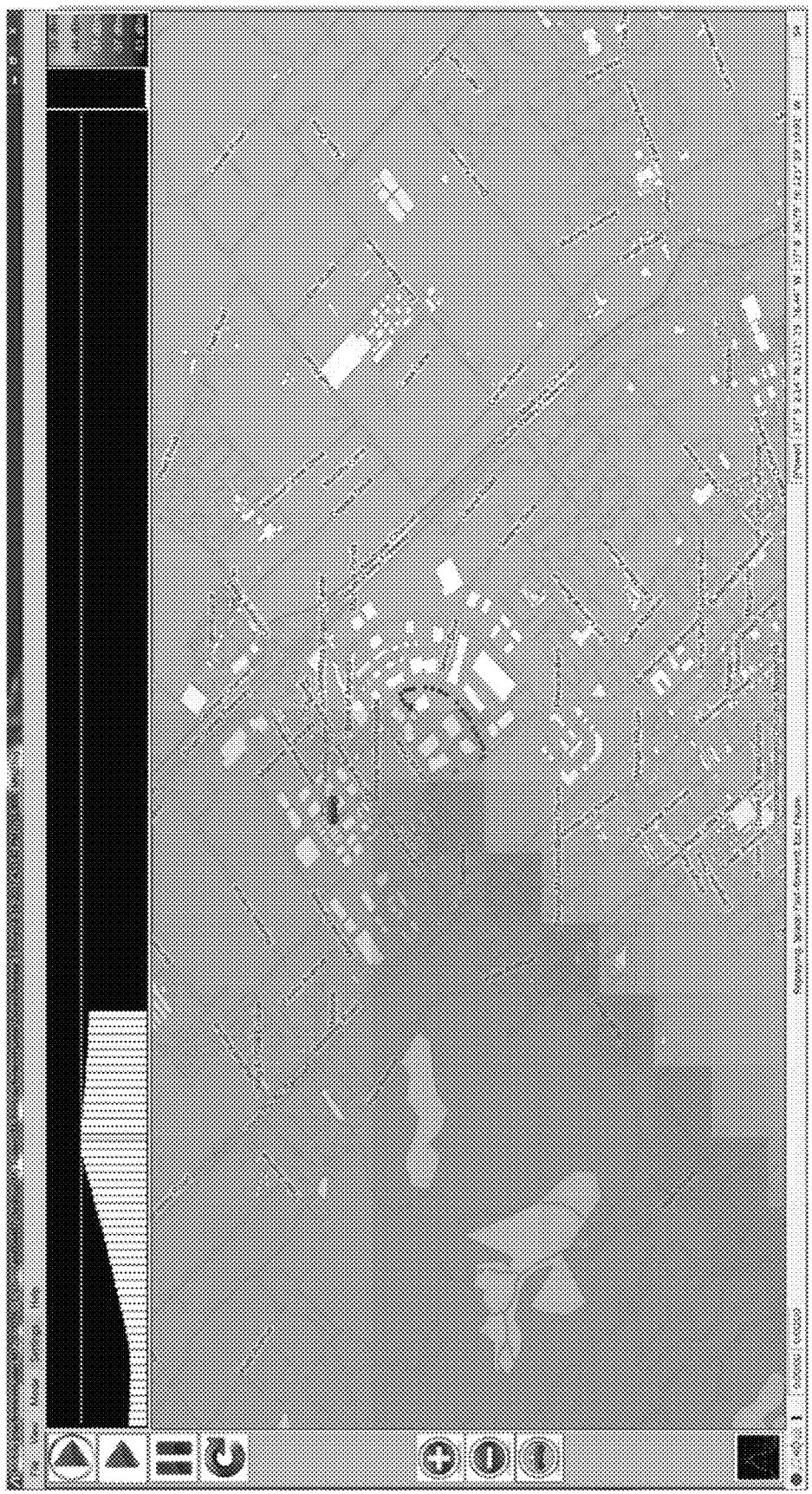
Figure 19:
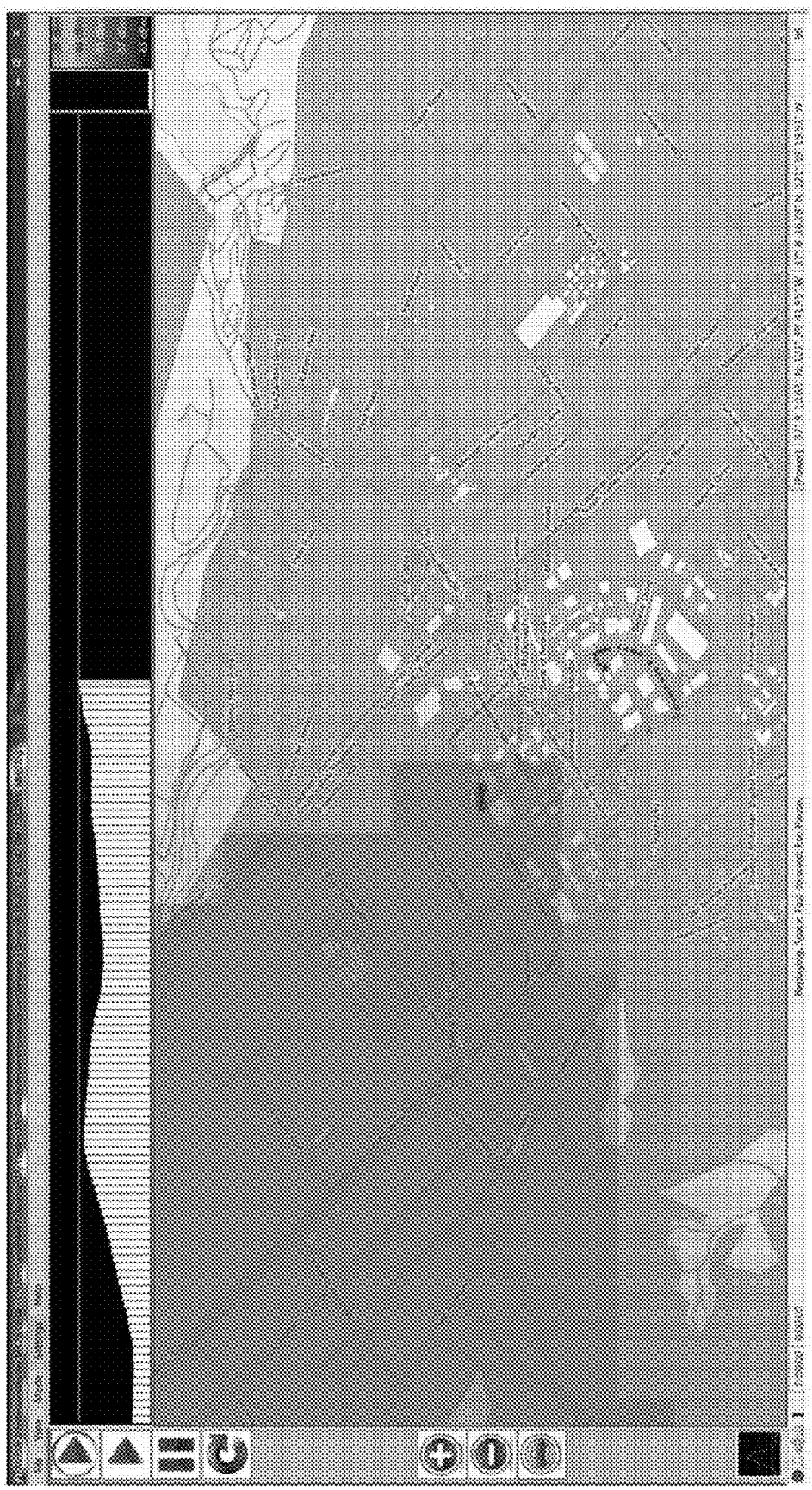
Figure 20:
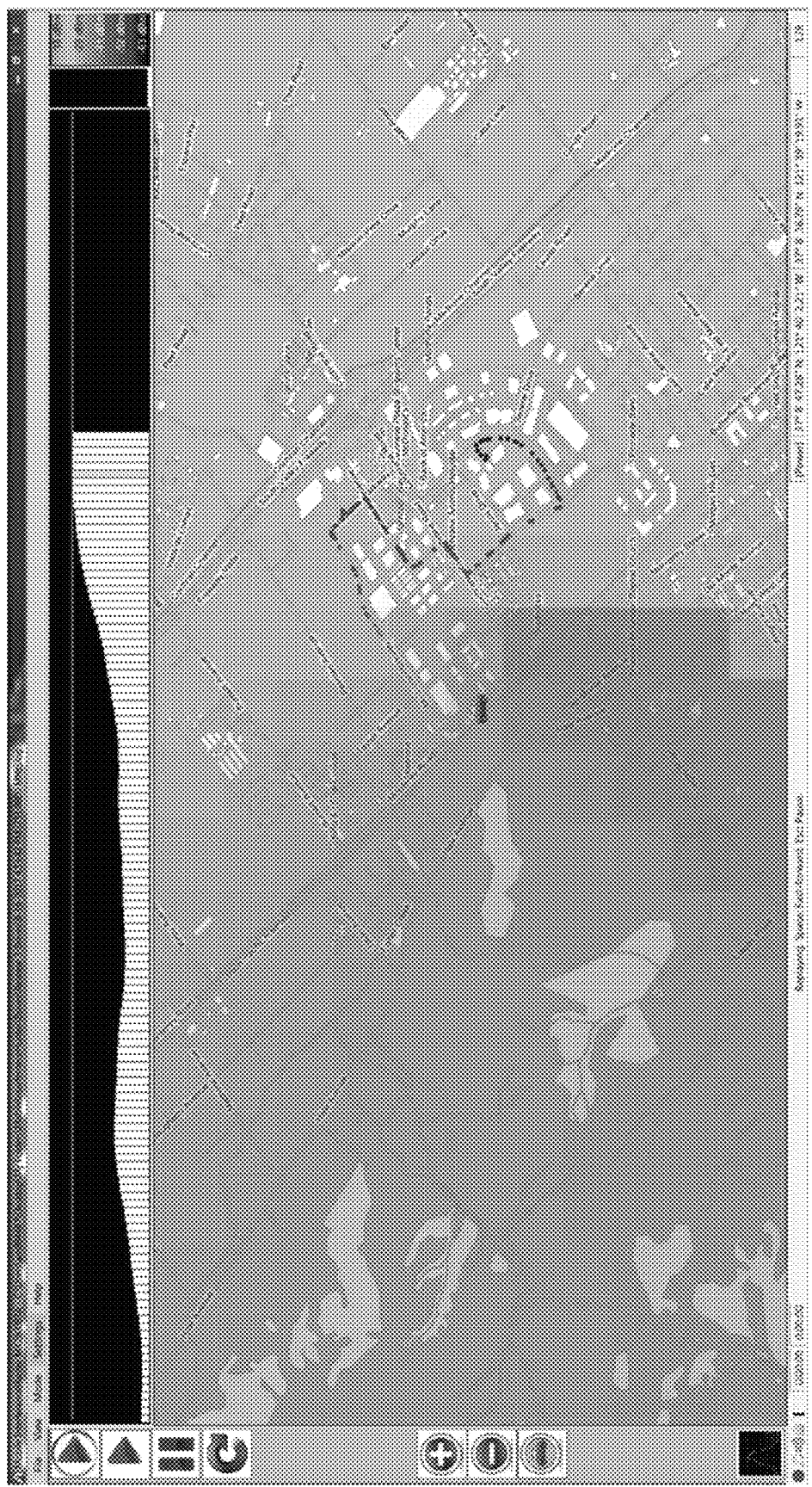
Figure 21:
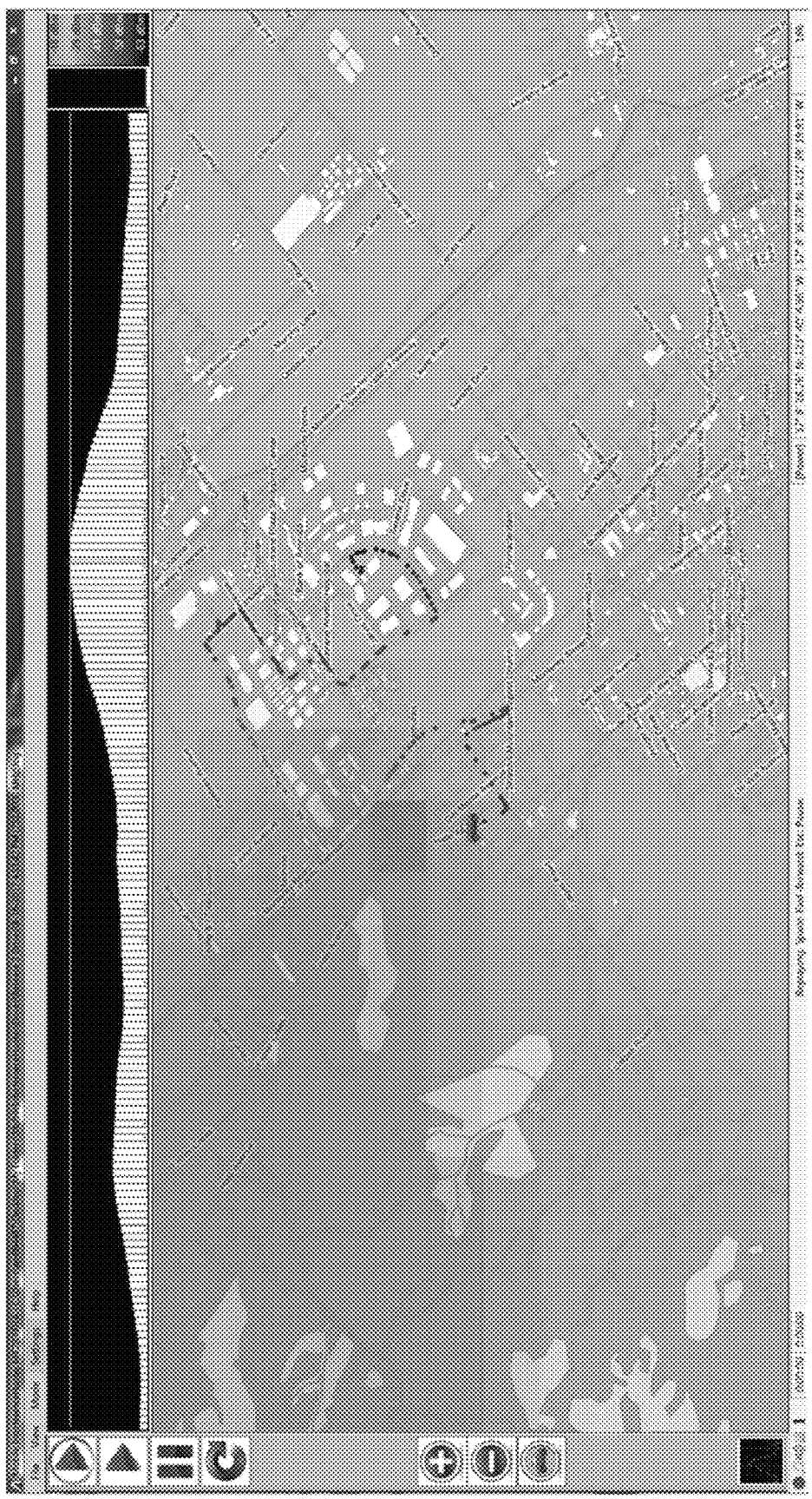
Figure 22:
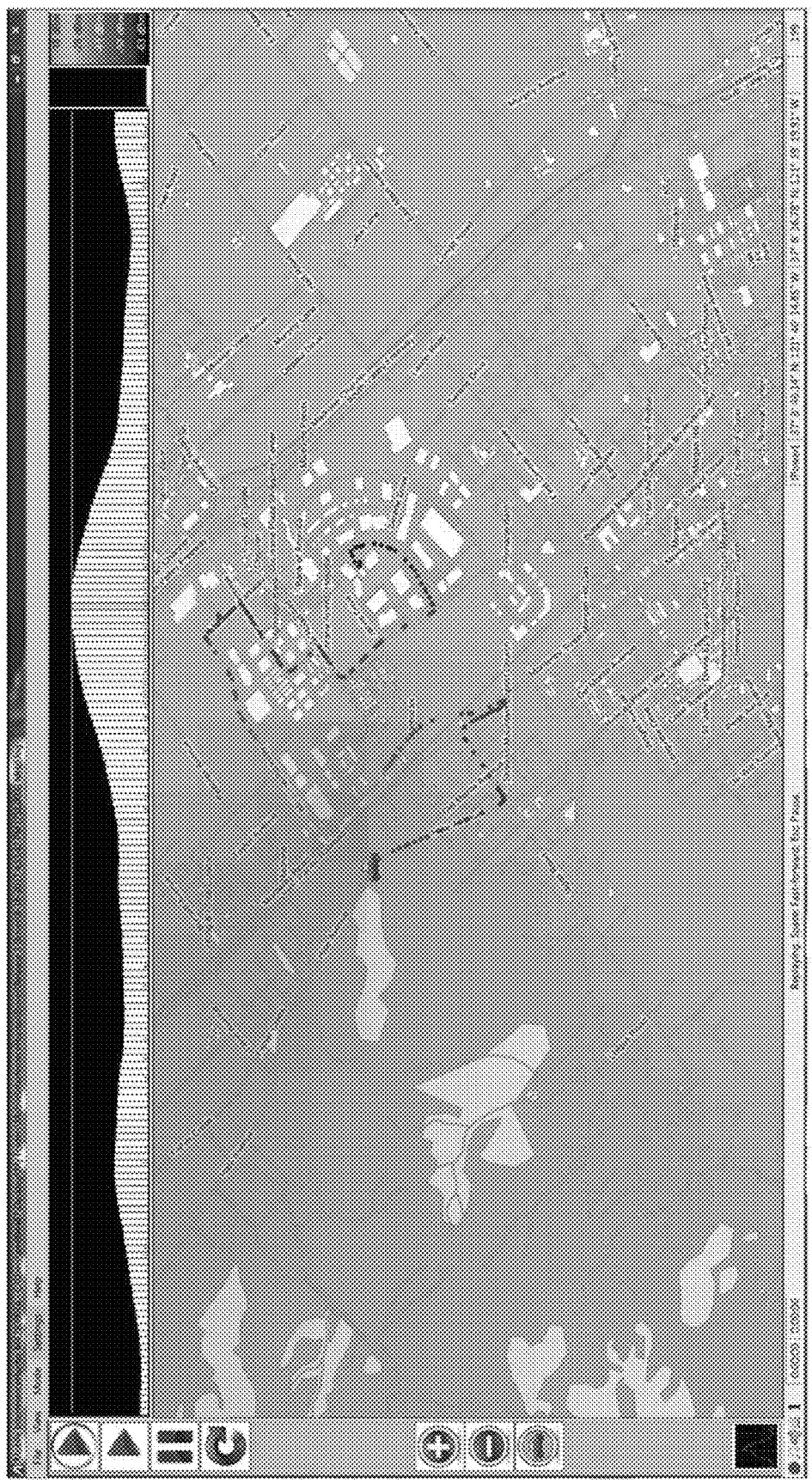
Figure 23:
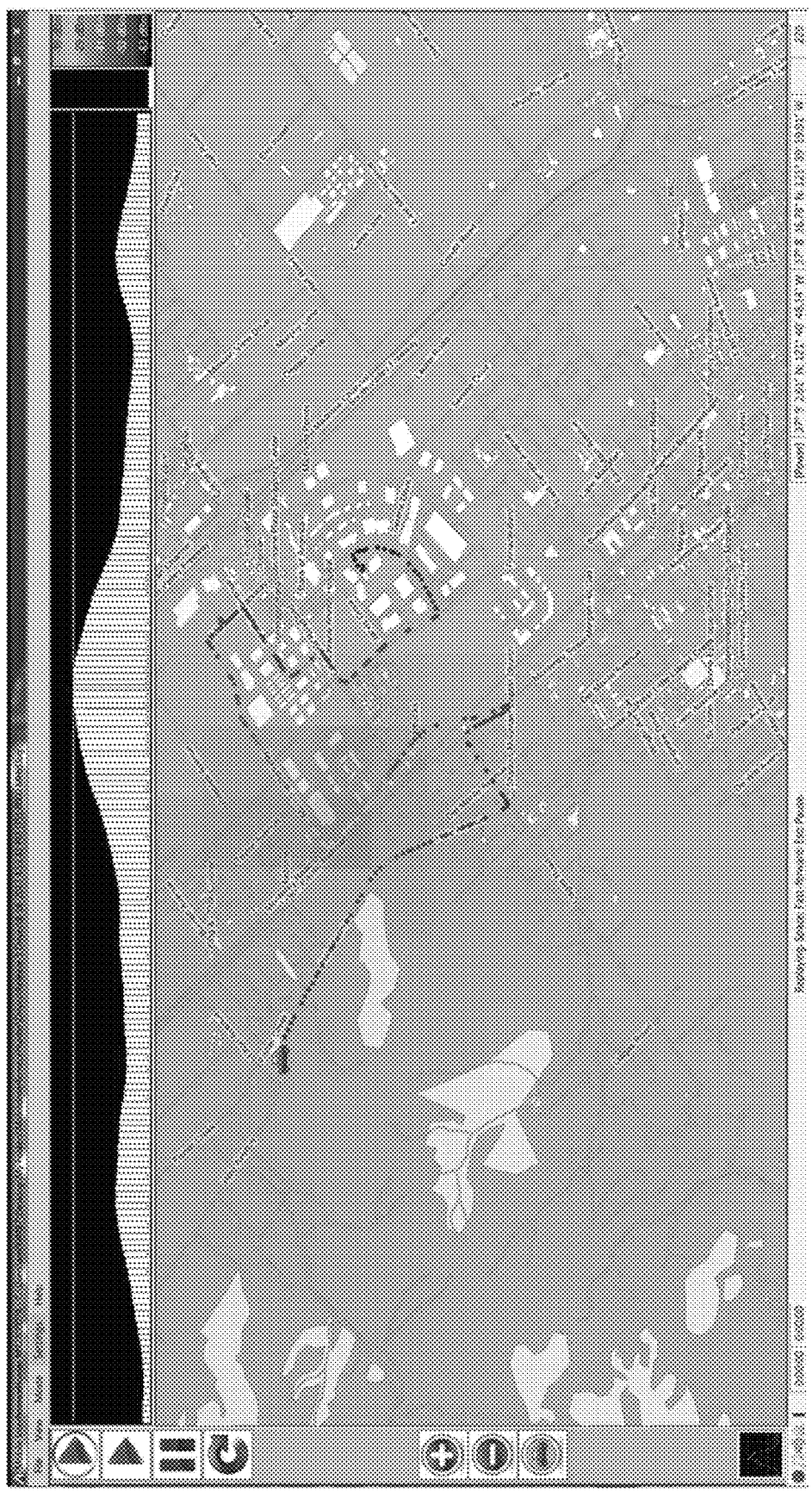
Figure 24:
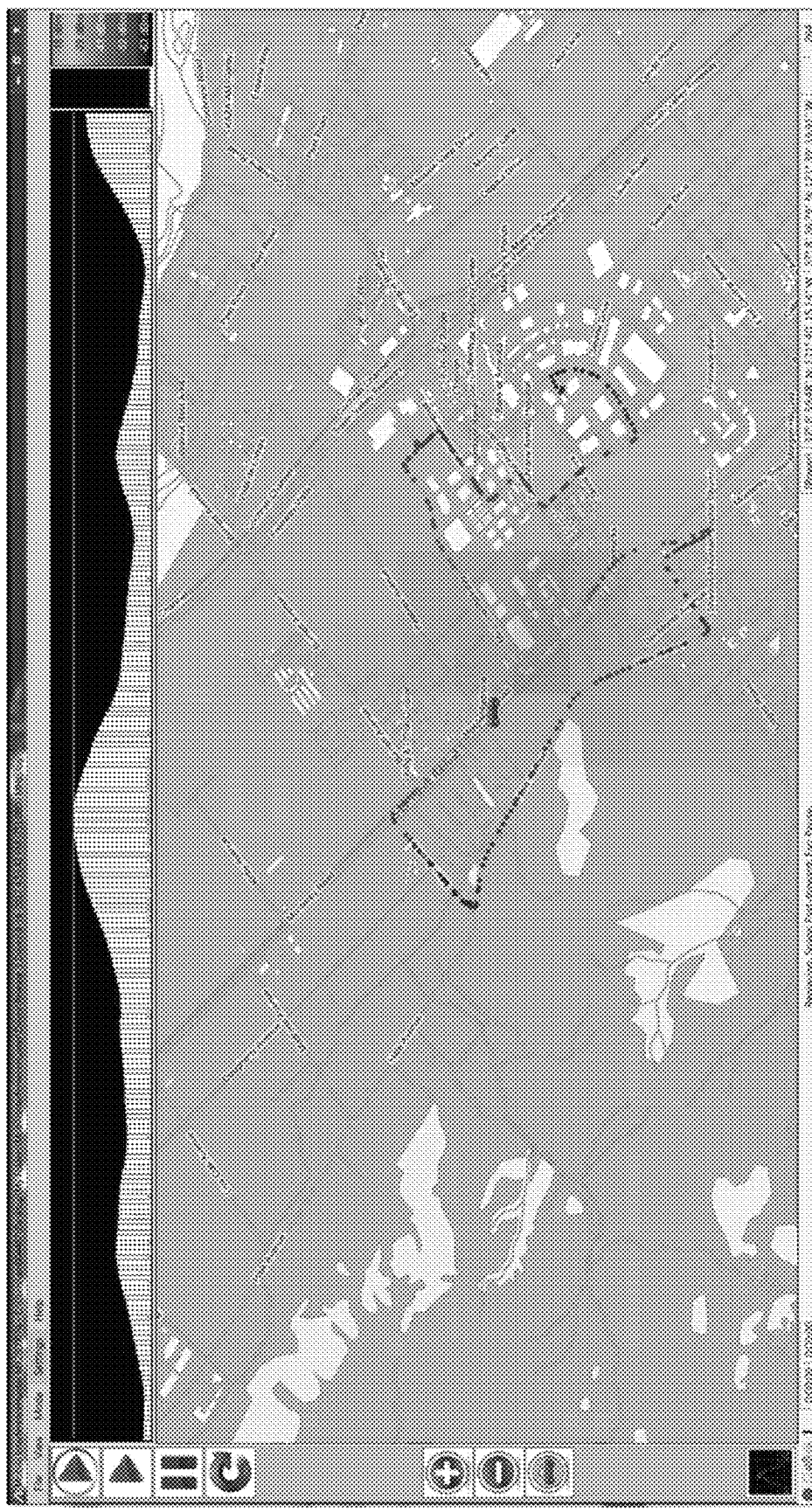
Figure 25:
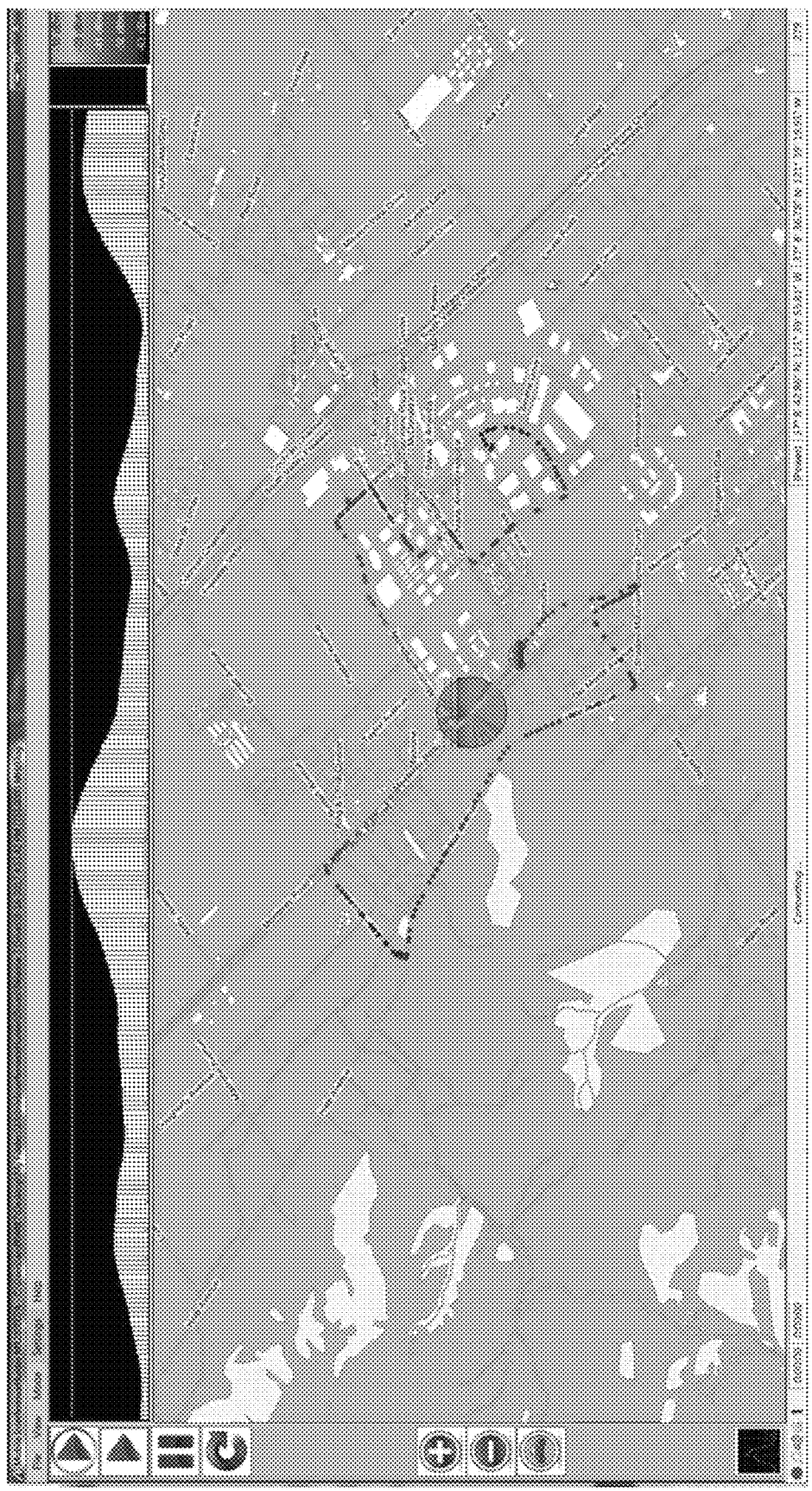

As shown in FIG. 14, at any point the user can access the setting of the software system and modify the sensitivity of the measurement data collection algorithm. As shown, the user can cycle through different sensitivities at will to recondition all of the data obtained during the process and/or to modify how data is collected. For example, if the user is within an urban canyon where there is lots of signal reflection of tall buildings, the sensitivity can be set to dense urban, to thereby increase data smoothing to remove artifacts that arise in dense areas, such as signal reflections, multi-path problems and attenuation. For example, heavier statistical analysis can be employed to predict a likelihood of data being usable and useful. It has been observed by the inventors that multipath reflections of GPS signals in dense urban areas can be problematic, and the vehicle's apparent location can shift, even while stopped. In an embodiment, measurement data is not collected when a vehicle is stopped, so that decreasing sensitivity in urban areas can include increasing a distance required for the vehicle to be considered as moving.

Initial Location Mode

Currently, the technique described above resembles the technique described in U.S. Pat. No. 9,560,537 to Lundquist et al. titled "SYSTEMS AND METHODS FOR DETERMINING A LOCATION OF A SIGNAL EMITTER BASED ON SIGNAL POWER", which is incorporated herein by reference. As described above, signals are mapped to generate a graphic showing an approximate location and indication of confidence of that location. The system enters a stage of estimating and illustrating an approximate location of the source of interference, along with a degree in confidence determined in the estimate based on the aggregate of the measurements of power and location. The path typically results in a square, for example a square that is maybe ten blocks on a side and indicated by colored dots around the perimeter of the square.

The more darkly colored dots indicate lower relative power measurements while the brighter, more intense dots indicate higher relative power measurements. However, it can be difficult to determine or estimate how far away the signal is from the vehicle, or whether the source of the signal is inside the square path or outside the square path. The location estimate can generate an ambiguous result. The estimation circle is generated based on geographic averaging, and as a result the estimation circle will always be inside that square. The technique does not understand the ambiguity, and can be misleading to a user. A source of the interfering signal could be a weak signal inside of the square or a strong signal strong signal coming from much farther away.

However, directions chosen for refining the search for the source of interference as described similar to the technique described above may be identified according to one of multiple possible RF propagation diminishment patterns. For example, by driving in a straight street, a user may have an indication of a signal interference source and where along the straight street the signal interference source location appears to bifurcate the street, but it may not know which direction on either side of the street that the signal interference source is located. As a result, users commonly spend time chasing this estimation circle to locate the signal interference source without clearly recognizing that the source is outside the pattern that the system has directed the user to follow. The user may be directed off of the path, which may result in confusion, because there is no clearly defined method or technique for resolving the failure of the initial pattern.

Embodiments in accordance with the present invention include systems and methods for directing a user's drive path in an efficient manner, so as to locate the source of an RF signal in the quickest manner possible. It eliminates a Mode 2 user trap (described above) that occurs if the user has not driven completely around the signal due to not knowing how far they need to drive before the drive path does surround the signal.

Referring to FIGS. 15-25, in accordance with an embodiment, a system (also referred to herein as a "mobile interference hunter") measures RF channel power at a location, plots that power on a map and continues to take additional measurements. The system essentially generates a map of the power of the signal that the user is chasing versus a geographic map of it how strong the signal is and where the signal is.

The system generates, as a result, a visual indication of missing data and could include, be supplemented by, or supplanted by an audial indication and/or instruction. The invention can be embodied in working software and display. In an embodiment, the display can include a graphical representation of a vehicle path and signal strength distinction as well as an indication of sampled data and a prediction (or suggestion) of additional sample sites overlaid on a map, such as a map generated by Google or Apple Maps or other map tool. In an embodiment, the predicted (or suggested) sites can be communicated in a "fog of war" style visual where the predicted (or suggested) sample sites are "darkened" on the map. Typically the predicted (or suggested) sites and graphical representation of these sites will resemble a parabola.

In the above described technique, once the vehicle has driven the whole square, e.g. having a perimeter of ten block per side, it may not be clear whether the next portion of the drive is inside the square or outside the square. It could be, e.g., in the southwest inside of the square pattern or it could be five miles to the southwest outside of the square pattern. As a result, under certain circumstances a user will have to make a modification to the driving paths ostensibly indicated using the current mode described above.

In accordance with an embodiment, system and method includes a new mode or technique that can be embodied in software and executed by one or more computers to use the recorded data including power measurements, and that will generate and display a probability map on a user's screen. As described above, the technique will generate predicted (or suggested) sites that are communicated in a "fog of war" style visual where the predicted (or suggested) sample sites are "darkened" on the map, for example in different shades of grey, or blue or in some other graphical representation that indicates "dark" spots on the map. The generated representation is overlaid on a map and typically, initially takes the shape of a parabola.

The parabola indicates an area on the map where more data is needed to definitively determine whether a signal interference source exists outside of a vehicle's path. As the user moves in the direction of the darkened areas on the map, additional power measurement data is collected, and the parabola can quickly resolve into a small circle, indicating a "penned" in area within which a signal interference source is located. The system can direct the user's driving to resolve the ambiguity in the possible location of the signal interference source.

In accordance with an embodiment, systems and techniques can be applied, for example, to perform RF direction finding without using a directional antenna, but rather by using an omnidirectional antenna.

In accordance with an embodiment, systems and techniques can be applied using the power measurement data obtained by the omnidirectional antenna. The power measurement data are interpreted using techniques different from those previously described. The data are applied as an expert system taking into account the map and locations where data have been collected on the map, along with the known physical attributes of RF signal propagation. The system uses this expert knowledge to communicate ambiguity to the user, in addition to certainty about potential sources determined based on the data. By focusing the user on resolving ambiguity, possible alternative location of sources outside of a vehicle path can be quickly eliminated so that a user does not spend time focusing on an area of potential false positives.

The ambiguity, or lack of data, can be communicated many different ways, although as described herein, indicating the area on a map as "darkened" would provide an intuitive indication of a lack of a data collected by the system. As the map opens up and the darkness is eliminated, if the measured signal strength is relatively low, the ambiguity is resolved and the user is focused on the more likely sources of the signal interference. Collecting data in the darkened area may also reveal the approximate location of the source of the signal interference, which will also assist in resolving the interference hunt, rather than simply eliminating potential sources of interference.

In accordance with an embodiment, the system and method can operate in two modes. The first mode, as described, represents ambiguity and guides a user to resolve the ambiguity to eliminate potential sources of interference outside of the greater area. The user can then switch to the original mode for indicating an approximate location of the source of interference, along with a degree in confidence.

By using the two modes together, initially false or misleading results can be quickly eliminated, reducing time spent by the user to identify the source of the interference.

FIGS. 15-25 illustrate a drive performed at Morgan Hill, Calif. And the point of this drive was to observe application of system and methods employing a technique in accordance with an embodiment. As can be seen, there is an initial blue shadowing over a large portion of the map to the west of the vehicle. There is lower power indicated in the east of the vehicle reflected by darker circles, and higher power indicated in the west of the vehicle reflected by lighter circles. The user is directed to drive to the west, and after an initial detour west moves west.

The new technique instructs the user, knowing there is a box indicating likely source location, to move to the west to resolve ambiguity. The method recognizes that a box has been driven but recommends looking outside of the box. The method directs the user to find the locations where there is no or low power over. Although the vehicle takes a bit of a circuitous route, the ability to resolve the ambiguity will depends on the roads and whether they are one way, etc. As the user continues following instructions communicated either visually, aurally, or both, regions of uncertainty are eliminated, collapsing the blue region to a small dot.

At this point the user is either offered the ability or instructed to switch over to the original technique displaying the estimation circle communicating the approximate location of the source of interference, along with a degree in confidence. What is desired is a display of strong signals surrounded on all sides by weak signals. This indicated that the signal interference source is surrounded.

The power calculation for determining the area where additional data is needed is performed by area averaging. The search area is divided up into a number of squares and the predicted signal strength is calculated in each based on the measured signal strength. The strength of the signal diminishes as the inverse square of the distance. As the route or path of the user changes, creating angles in the path, a center of mass calculation can re-center or predict the location of a signal interference source, predicting where the center of mass may be and using that to generate driving directions.

In accordance with an embodiment, a method includes a driving mode, using power of arrival at a known source frequency. The method uses power levels around a maximum power reading position to calculate a center of mass of known power levels. The method further seeks to balance the center of mass around a maximum level. The method then indicates, visually with a color overlay for example, areas that have low information density—these places need more power readings to determine if the source is in that direction. The method then provides visual indication of when the power balance is achieved, meaning that there is enough information to begin using established Power of Arrival (POA) methods in mobile interference hunting ("MIH") to target and locate the RF source. Such a method can comprise an additional location technique, helping first locate the general area and outlined perimeter of search for a RF source.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

The invention claimed is:

1. A method of estimating a location of an interference signal source, comprising:
   using a first antenna configured to receive a signal from the interference signal source;
   using a second antenna arranged proximate to the first antenna and configured to receive global positioning system (GPS) signals;
   determining an initial trend in variation in power of a received signal from the interference signal source relative to a position of the second antenna by iteratively performing steps including
      measuring the power of the received signal using the first antenna,
      receiving three or more GPS signals using the second antenna,
      determining the position of the second antenna based on the received GPS signals when measuring power for the received signal, and
      comparing the power of the received signal and the position of the second antenna to previously measured powers of the received signal and determined positions of the second antenna;
   wherein upon determining the initial trend, the initial trend is a current trend;
   directing a repositioning of the second antenna, upon determining the initial trend, by iteratively performing steps including
      indicating a direction for the repositioning of the second antenna based on the current trend,
      measuring the power of the received signal using the first antenna,
      receiving three or more GPS signals using the second antenna,
      determining the position of the second antenna based on the received GPS signals when measuring power for the received signal, and
      refining the current trend based on the power of the received signal and the position of the second antenna; and
   identifying a secondary area associated with a lack of power measurement outside of an area traveled by directing the repositioning of the second antenna;
   determining, based on criteria including a size of the secondary area and map information including street information, a further repositioning of the second antenna to reduce the secondary area using a targeted set of directions for the repositioning of the second antenna;
   determining an estimate of the location of the interference signal source, upon iteratively performing the steps to direct the repositioning of the second antenna and further repositioning of the second antenna to reduce the secondary area.

2. The method of claim 1, further comprising:
   determining a confidence in the estimate based on an aggregate of the measurements of power and location; and
   indicating the location of the interference signal source, upon determining the estimate, on the map presented on a display;
   wherein the indication of the location includes an indication of the confidence in the estimate.

3. The method of claim 2, wherein the indication of confidence in the estimate includes an indication of a direction relative to the location where the power of the received signal has been measured.

4. The method of claim 3, wherein the indication is an icon located on the map and the indication of confidence includes shading of the icon.

5. The method of claim 4, wherein the map is divided into a plurality of cells and the icon is sized to overlap one or more of the cells based on the estimate.

6. The method of claim 1, wherein the estimate is a current estimate and the method further comprising:
   iteratively performing steps including
      measuring the power of the received signal using the first antenna,
      receiving three or more GPS signals using the second antenna,
      determining the position of the second antenna based on the received GPS signals when measuring power for the received signal, and
      refining the current estimate of the location of the interference signal source based on the power of the received signal and the position of the second antenna.

7. The method of claim 1, wherein the map is divided into a plurality of cells; and
   wherein the estimate of the location of the interference signal source is determined by
      generating a data plot by assigning each measurement of power to a cell of the map based on a corresponding determination of location of the second antenna,
      generating a plurality of models,
      wherein each model assigns the interference signal source to a cell from the plurality of cells,
      wherein each model assigns a transmit power of the interference signal source, and
      determining one or more best models from the plurality of models that matches the data plot within a predetermined margin based on a best fit analysis, and
      estimating the location of the interference signal source as one or more cells based on the determination of the one or more best models.

8. The method of claim 7, wherein the data plot is generated using measurements of power and corresponding determination of location of the second antenna up to a predefined maximum number selected from the collected measurements of power.

9. The method of claim 8, wherein the selected measurements are selected based on power level and statistical estimate of reliability.

10. A system of estimating a location of an interference signal source, comprising:
   an omnidirectional antenna configured to receive a signal from the interference signal source;
   a global positioning system (GPS) antenna arranged proximate to the omnidirectional antenna and configured to receive GPS signals;
   a spectrum analyzer configured to receive data from the GPS antenna and the omnidirectional antenna;
   one or more microprocessors;
   a software system including a non-transitory computer readable storage medium having instructions which when executed cause the one or more microprocessors to perform the steps comprising determining an initial trend in variation in power of a received signal from the interference signal source relative to a position of the GPS antenna by iteratively performing steps including
　　measuring the power of the received signal using the omnidirectional antenna,
　　receiving three or more GPS signals using the GPS antenna,
　　determining the position of the GPS antenna based on the received GPS signals when measuring power for the received signal, and
　　comparing the power of the received signal and the position of the GPS antenna to previously measured powers of the received signal and determined positions of the GPS antenna;
wherein upon determining the initial trend, the initial trend is a current trend;
directing a repositioning of the GPS antenna, upon determining the initial trend, by iteratively performing steps including
　　indicating a direction for the repositioning of the GPS antenna based on the current trend,
　　measuring the power of the received signal using the omnidirectional antenna,
　　receiving three or more GPS signals using the GPS antenna,
　　determining the position of the GPS antenna based on the received GPS signals when measuring power for the received signal, and
　　refining the current trend based on the power of the received signal and the position of the GPS antenna; and
identifying a secondary area associated with a lack of power measurement outside of an area traveled by directing the repositioning of the GPS antenna;
determining, based on criteria including a size of the secondary area and map information including street information, a further repositioning of the GPS antenna to reduce the secondary area using a targeted set of directions for the repositioning of the GPS antenna;
determining an estimate of the location of the interference signal source, upon iteratively performing the steps to direct the repositioning of the GPS antenna and further repositioning of the GPS antenna to reduce the secondary area.

11. The system of claim 10, wherein the non-transitory computer readable storage medium further includes instructions for
determining a confidence in the estimate based on an aggregate of the measurements of power and location; and
indicating the location of the interference signal source, upon determining the estimate, on the map presented on a display;
wherein the indication of the location includes an indication of the confidence in the estimate.

12. The system of claim 11, wherein the indication of confidence in the estimate includes an indication of a direction relative to the location where the power of the received signal has been measured.

13. The system of claim 12, wherein the indication is an icon located on the map and the indication of confidence includes shading of the icon.

14. The system of claim 13, wherein the map is divided into a plurality of cells and the icon is sized to overlap one or more of the cells based on the estimate.

15. The system of claim 10, wherein the estimate is a current estimate and the method further comprising:
iteratively performing steps including
　　measuring the power of the received signal using the omnidirectional antenna,
　　receiving three or more GPS signals using the GPS antenna,
　　determining the position of the GPS antenna based on the received GPS signals when measuring power for the received signal, and
　　refining the current estimate of the location of the interference signal source based on the power of the received signal and the position of the GPS antenna.

16. The system of claim 10, wherein the map is divided into a plurality of cells; and
wherein the estimate of the location of the interference signal source is determined by
　　generating a data plot by assigning each measurement of power to a cell of the map based on a corresponding determination of location of the GPS antenna,
　　generating a plurality of models,
　　wherein each model assigns the interference signal source to a cell from the plurality of cells,
　　wherein each model assigns a transmit power of the interference signal source, and
　　determining one or more best models from the plurality of models that matches the data plot within a predetermined margin based on a best fit analysis, and
　　estimating the location of the interference signal source as one or more cells based on the determination of the one or more best models.

17. The system of claim 16, wherein the data plot is generated using measurements of power and corresponding determination of location of the GPS antenna up to a predefined maximum number selected from the collected measurements of power.

18. The system of claim 17, wherein the selected measurements are selected based on power level and statistical estimate of reliability.

19. A non-transitory computer readable storage medium having instructions thereon which when executed cause one or more microprocessors to estimate a location of an interference signal source, the instructions including the steps of:
determining an initial trend in variation in power of a received signal from the interference signal source relative to a position of a global positioning system (GPS) antenna by iteratively performing steps including
　　measuring the power of the received signal using an omnidirectional antenna,
　　receiving three or more GPS signals using the GPS antenna,
　　determining the position of the GPS antenna based on the received GPS signals when measuring power for the received signal, and
　　comparing the power of the received signal and the position of the GPS antenna to previously measured powers of the received signal and determined positions of the GPS antenna;
wherein upon determining the initial trend, the initial trend is a current trend;
directing a repositioning of the GPS antenna, upon determining the initial trend, by iteratively performing steps including
　　indicating a direction for the repositioning of the GPS antenna based on the current trend, measuring the power of the received signal using the omnidirectional antenna, receiving three or more GPS signals using the GPS antenna, determining the position of the GPS antenna based on the received GPS signals when measuring power for the received signal, and refining the current trend based on the power of the received signal and the position of the GPS antenna; and identifying a secondary area associated with a lack of power measurement outside of an area traveled by directing the repositioning of the GPS antenna;

determining, based on criteria including a size of the secondary area and map information including street information, a further repositioning of the GPS antenna to reduce the secondary area using a targeted set of directions for the repositioning of the GPS antenna;

determining an estimate of the location of the interference signal source, upon iteratively performing the steps to direct the repositioning of the GPS antenna and further repositioning of the GPS antenna to reduce the secondary area.

20. The method of claim 19, wherein the non-transitory computer readable storage medium further includes instructions for determining a confidence in the estimate based on an aggregate of the measurements of power and location; and indicating the location of the interference signal source, upon determining the estimate, on the map presented on a display;

wherein the indication of the location includes an indication of the confidence in the estimate.

* * * * *